(12) United States Patent
Okamura et al.

(10) Patent No.: US 9,199,169 B2
(45) Date of Patent: Dec. 1, 2015

(54) COMPUTER-READABLE STORAGE MEDIUM AND GAME APPARATUS

(75) Inventors: Yuichiro Okamura, Kyoto (JP); Kazumi Totaka, Kyoto (JP); Junya Osada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2160 days.

(21) Appl. No.: 12/233,040

(22) Filed: Sep. 18, 2008

(65) Prior Publication Data

US 2009/0312106 A1 Dec. 17, 2009

(30) Foreign Application Priority Data

Jun. 12, 2008 (JP) .................................. 2008-154284

(51) Int. Cl.
*A63F 9/24* (2006.01)
*A63F 13/40* (2014.01)
(Continued)

(52) U.S. Cl.
CPC .................. *A63F 13/10* (2013.01); *A63F 13/06* (2013.01); *G06F 3/0346* (2013.01); *G10H 1/40* (2013.01); *A63F 2300/105* (2013.01);
(Continued)

(58) Field of Classification Search
CPC ................................ A63F 13/10; A63F 13/497
USPC ............. 463/3, 16, 20, 35–37, 40; 273/138.1, 273/138.2, 139, 141 A, 141 R, 142 A, 142 B, 273/142 C, 142 H, 142 HA, 460–461; 84/484, 600, 635–636, 644–645, 84/651–652, 710, 730; 345/475, 606; 381/61–63, 94.4; 725/38, 40, 133, 141, 725/153; 968/818, 820–821
See application file for complete search history.

(56) References Cited

U.S. PATENT DOCUMENTS 4,342,454 A * 8/1982 Baer et al. ........................ 463/31
5,342,054 A * 8/1994 Chang et al. .................. 473/156
(Continued)

FOREIGN PATENT DOCUMENTS

JP    H10-143151 A    5/1998
JP    2000-51518      2/2000
JP    2004-329950     11/2004

OTHER PUBLICATIONS (Website) http://www.korg.co.jp/Product/Synthesizer/PA1Xpro/webguide/p1-2.html, Jul. 23, 2008 (Partial Translation).
(Continued)

*Primary Examiner* — Steve Rowland
(74) *Attorney, Agent, or Firm* — Nixon & Vanderhye, P.C.

(57) ABSTRACT

When a music performance game starts, the user selects a part to be assigned to himself/herself. When the selection of the assigned part is completed, an ensemble starts. When the ensemble starts, the user can participate in the ensemble by performing an input operation corresponding to the assigned part. During the ensemble, history data representing the user's musical performances in chronological order is generated and stored in an external main memory. When the ensemble ends, the user can play again, changing assigned parts. At this time, as for the part currently selected by the user, the instrument is played based on the user's input, while the history data representing the user's current musical performances in chronological order is generated. Of the other parts, as for the parts that the user has selected earlier, the instruments are played automatically based on the history data.

17 Claims, 25 Drawing Sheets

(51) Int. Cl.
*A63F 13/20* (2014.01)
*G06F 3/0346* (2013.01)
*G10H 1/40* (2006.01)

(52) U.S. Cl.
CPC .... *A63F 2300/634* (2013.01); *A63F 2300/638* (2013.01); *A63F 2300/8047* (2013.01); *G10H 2220/135* (2013.01); *G10H 2220/206* (2013.01); *G10H 2220/395* (2013.01)

(56) References Cited

U.S. PATENT DOCUMENTS

| | | | | |
|---|---|---|---|---|
| 5,507,485 | A | * | 4/1996 | Fisher ........................ 473/407 |
| 5,779,548 | A | * | 7/1998 | Asai et al. .................... 463/31 |
| 5,990,406 | A | * | 11/1999 | Nakamura et al. ............ 84/609 |
| 6,072,504 | A | * | 6/2000 | Segen ........................ 345/474 |
| 6,124,862 | A | * | 9/2000 | Boyken et al. .............. 345/419 |
| 6,226,008 | B1 | * | 5/2001 | Watanabe et al. ............ 345/427 |
| 6,280,323 | B1 | * | 8/2001 | Yamazaki et al. .............. 463/4 |
| 6,609,979 | B1 | * | 8/2003 | Wada ............................ 463/43 |
| 6,650,329 | B1 | * | 11/2003 | Koike ........................ 345/473 |
| 6,835,137 | B1 | * | 12/2004 | Nakamura .................... 463/42 |
| 7,214,133 | B2 | | 5/2007 | Jen et al. |
| 7,601,056 | B2 | * | 10/2009 | Watanabe ........................ 463/7 |
| 2001/0023201 | A1 | * | 9/2001 | Takatsuka et al. .............. 463/31 |
| 2004/0224741 | A1 | | 11/2004 | Jen et al. |

OTHER PUBLICATIONS

Japanese Office corresponding to Japanese Application No. JP2008-154284 dated Jun. 25, 2013 (with translation).

Kato, "Nintendo Conference 2007, Autumn: It's been a year and a half-Introducing with Demonstration of 'Wii Music (tentatively)'" [online], Oct. 11, 2007, ITmedia, Inc., ITmedia Games, [searched on Jun. 18, 2013], Internet <URL:http://www.itmedia.cojp/games/articles/0710/11/news069.html>.

* cited by examiner

F I G. 4
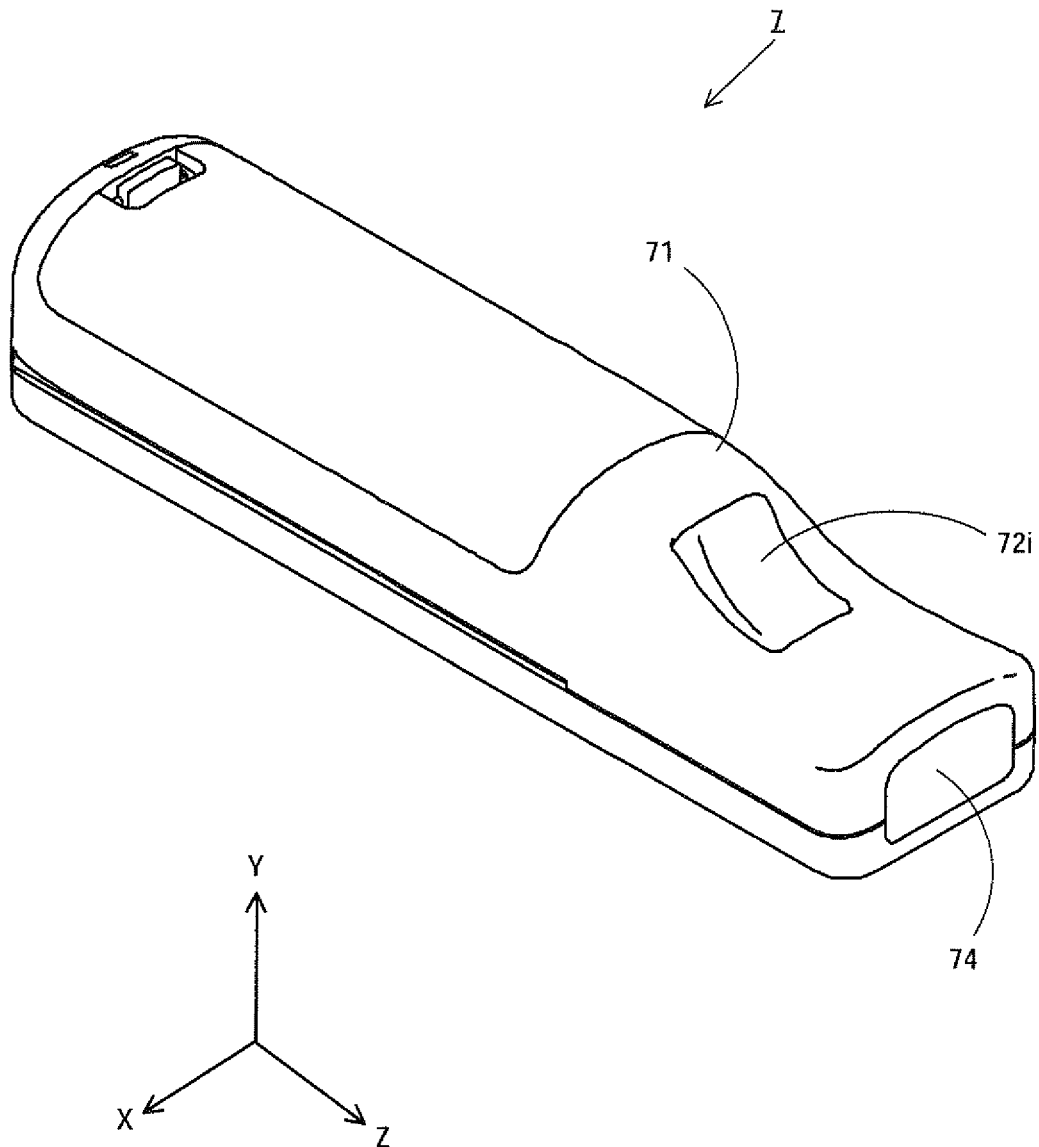

F I G. 1 1
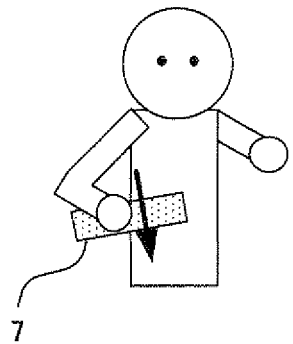
F I G. 1 2
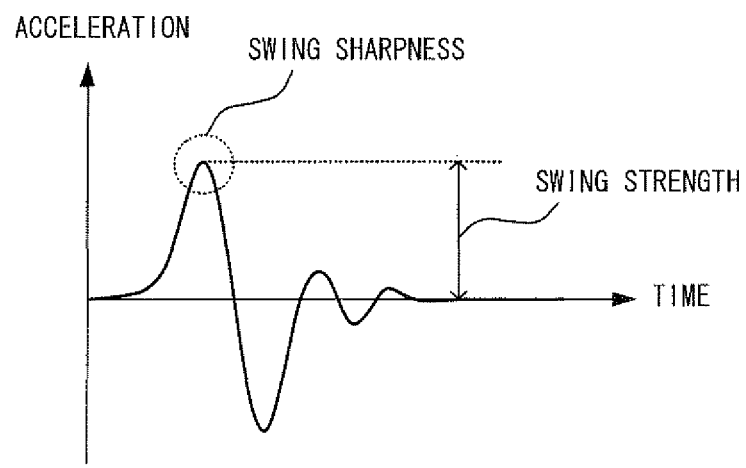
F I G. 1 3
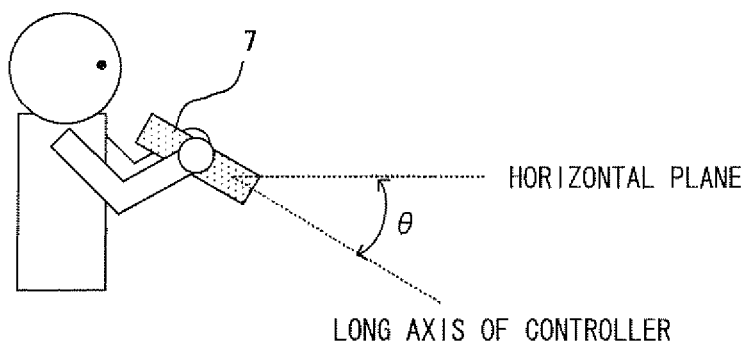

FIG. 17
| COMPOSITION DATA 122 | | | | |
|---|---|---|---|---|
| TRACK | REPRODUCTION TIMING [tick] | NOTE LENGTH [tick] | PITCH | VELOCITY |
| 1 | 0 | 96 | 67 | 100 |
| 1 | 96 | 48 | 64 | 100 |
| 1 | 144 | 24 | 64 | 100 |
| 1 | 168 | 24 | 65 | 100 |
| ... | ... | ... | ... | ... |
FIG. 18
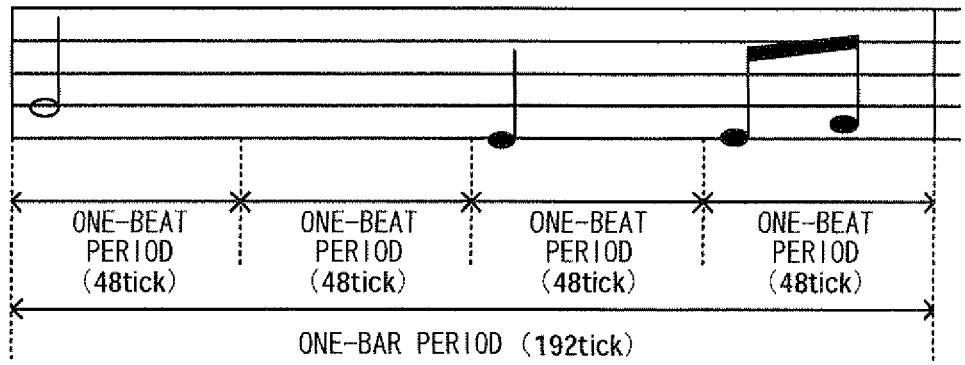
FIG. 19
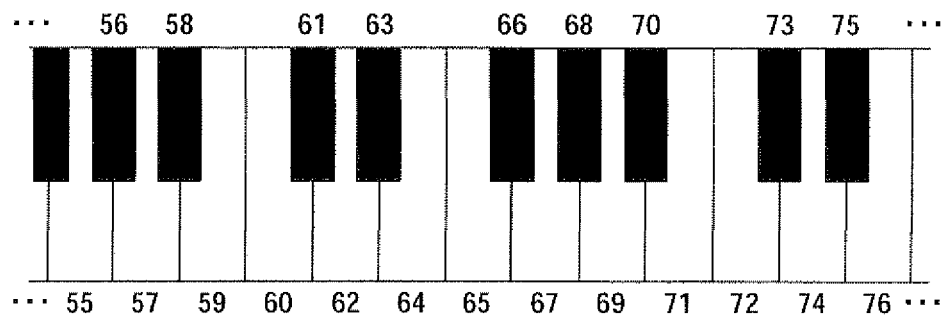

F I G. 2 0

| TIME | INPUT BUTTON | VOLUME (0~63) | SWING SHARPNESS (0~63) | INSTRUMENT TYPE | |
|---|---|---|---|---|---|
| t1 | NOT PRESSED | 30 | 42 | GUITAR | ← PERFORMANCE EVENT DATA |
| t2 | 2 | 25 | 50 | GUITAR | |
| t3 | NOT PRESSED | 28 | 45 | GUITAR | |
| ⋮ | ⋮ | ⋮ | ⋮ | ⋮ | |

↓ TIME

F I G. 2 1

| TIME (4 BYTES IN TOTAL) ||
|---|---|
| 2 HIGH-ORDER BYTES | 2 LOW-ORDER BYTES |
| COMPOSITION POSITION [tick] | PERFORMANCE-STOPPED-PERIOD POSITION [NUMBER OF FRAMES] |

FIG. 22

| TIME | INPUT BUTTON | VOLUME (0~63) | SWING SHARPNESS (0~63) | INSTRUMENT TYPE | PART |
|---|---|---|---|---|---|
| t1 | — | 30 | 42 | GUITAR | MELODY 1 |
| t2 | — | 25 | 50 | BASS A | BASS |
| t3 | — | 28 | 45 | BASS A | BASS |
| t4 | — | — | — | NOT ASSIGNED | CONDUCTOR |
| t5 | — | 60 | — | PERCUSSION A | PERCUSSION |
| t6 | 1, 2 | 45 | — | TRUMPET | MELODY 2 |
| t7 | UP | — | — | — | CAMERA |
| t8 | 2 | 28 | — | TRUMPET | MELODY 2 |
| ⋮ | ⋮ | ⋮ | ⋮ | ⋮ | ⋮ |

TIME

FIG. 31A

| FRAME NUMBER | 1 | 2 | 3 | 4 | 5 | 6 | 7 | 8 | 9 | 10 | 11 | 12 |
|---|---|---|---|---|---|---|---|---|---|---|---|---|
| TEMPO | FAST | | | | STOP | | | | | SLOW | | |
| COMPOSITION POSITION | 10 | 13 | 16 | 19 | 19 | 19 | 19 | 19 | 20 | 21 | 22 | 23 |
| PERFORMANCE-STOPPED-PERIOD POSITION | 0 | 0 | 0 | 0 | 1 | 2 | 3 | 4 | 0 | 0 | 0 | 0 |
| CURRENT TIME | 100 | 130 | 160 | 190 | 191 | 192 | 193 | 194 | 200 | 210 | 220 | 230 |
| TIMING OF STORING PERFORMANCE EVENT DATA | A | | B | | | C | | | | | D | E |

FIG. 31B

| FRAME NUMBER | 1 | 2 | 3 | 4 | 5 | 6 | 7 | 8 | 9 | 10 | 11 | 12 |
|---|---|---|---|---|---|---|---|---|---|---|---|---|
| TEMPO | NORMAL | | | | | STOP | | | | | VERY FAST | |
| COMPOSITION POSITION | 9 | 11 | 13 | 15 | 17 | 17 | 17 | 17 | 17 | 17 | 22 | 27 |
| PERFORMANCE-STOPPED-PERIOD POSITION | 0 | 0 | 0 | 0 | 0 | 1 | 2 | 3 | 4 | 5 | 0 | 0 |
| CURRENT TIME | 90 | 110 | 130 | 150 | 170 | 171 | 172 | 173 | 174 | 175 | 220 | 270 |
| TIMING OF PROCESSING PERFORMANCE EVENT DATA | | A(100) | | | B(160) | | | | | | C(192) D(220) | E(230) |

# COMPUTER-READABLE STORAGE MEDIUM AND GAME APPARATUS

CROSS REFERENCE TO RELATED APPLICATION

The disclosure of Japanese Patent Application No. 2008-154284, filed on Jun. 12, 2008, is incorporated herein by reference.

BACKGROUND OF THE INVENTION

1. Field of the Invention

The present invention relates to a computer-readable storage medium and a game apparatus, and particularly to a computer-readable storage medium and a game apparatus that store the history of operation inputs provided by a user during a game and perform a process using the stored history.

2. Description of the Background Art

In a game apparatus disclosed in Japanese Laid-Open Patent Publication No. 2000-51518, a user downloads, to the game apparatus via a network, replay data for reproducing the process of another user having played a game in another game apparatus, and thus reproduces the downloaded replay data in the game apparatus and simultaneously plays the game based on the user's operation on the game apparatus.

However, in the above-described game apparatus, to generate replay data for reproducing the process of a plurality of users having simultaneously played the game, it is necessary for the plurality of users to simultaneously play the game in order to generate the replay data.

Further, conventionally, as in a music performance game where, for example, a plurality of users simultaneously play their own instruments, in a game where expressive power is improved by simultaneously performing multiple types of processes in the game, a user who can only play the game alone can merely play it with low expressive power.

SUMMARY OF THE INVENTION

Therefore, an object of the present invention is to provide a computer-readable storage medium and a game apparatus that can generate replay data for reproducing game processing as if a plurality of users simultaneously played the game, without requiring a plurality of users to actually simultaneously play a game.

The present invention has the following features to attain the above-mentioned object. Note that the reference numerals, the figure numbers in parentheses, the supplemental descriptions, and the like indicate an example of the correspondence with the drawings so as to assist understanding of the present invention, and do not limit the scope of the present invention in any way.

A computer-readable storage medium of the present invention is a computer-readable storage medium having stored therein a game program (121) to be executed by a computer (10) of a game apparatus (3) for storing replay data (123) for reproducing game processing executed based on an operation input from an input device (7) in storage means (12).

The game program causes the computer of the game apparatus to execute a replay data reading step (S50), a game processing step (S42, S51), and are play data generating step (S43).

The replay data reading step is a step of reading, from the storage means, first replay data (123), generated based on the operation input from the input device and stored in the storage means when first game processing has been executed earlier, for reproducing the first game processing. The game processing step is a step of executing second game processing based on both the first replay data read from the storage means in the replay data reading step and a current operation input from the input device. The replay data generating step is a step of generating second replay data (123) for reproducing the second game processing executed in the game processing step and storing the generated second replay data in the storage means.

The game processing step may include are production speed changing step (S63) of reproducing the first game processing based on the first replay data and also changing a reproduction speed of the first game processing in accordance with the current operation input from the input device.

The game program may further cause the computer to execute a game processing selecting step (S33) of selecting either reproduction-speed-variable processing (processing executed when a user selects a conductor part) for reproducing the first game processing based on the first replay data and also changing a reproduction speed of the first game processing in accordance with the current operation input from the input device or reproduction-speed-invariable processing (processing executed when the user selects a part other than the conductor part) for reproducing the first game processing based on the first replay data at the same speed as when the first replay data has been generated. In the game processing step, the processing selected from the reproduction-speed-variable processing and the reproduction-speed-invariable processing, in the game processing selecting step, may be executed as the second game processing.

The game processing may include a process (S42) of playing a composition in accordance with the operation input from the input device.

The first game processing may be the process of playing a composition in accordance with the operation input from the input device. The game processing step may include a tempo changing step (S63) of reproducing, based on the first replay data, the playing of the composition, performed in the first game processing and also changing a tempo of the reproduced playing in accordance with the current operation input from the input device.

In the tempo changing step, the tempo may be changed each time the operation input from the input device occurs ("Yes" in S62).

In the tempo changing step, the tempo may be determined in accordance with an occurrence interval (a conductor input interval counter 129) of the operation inputs from the input device.

In the tempo changing step, each time the operation input from the input device occurs, the tempo may be determined in accordance with an average or a weighted average of the occurrence intervals of the operation inputs from the input device during the most recent period of a certain length (S86).

The game processing step may include: a composition playing step (S51, S73) of playing a composition based on composition data (122) stored in the storage means and/or the first replay data read from the storage means in the replay data reading step; a tempo changing step (S63) of, in accordance with the first replay data read from the storage means in the replay data reading step or the current operation input from the input device, changing a tempo of the playing of the composition played in the composition playing step; and a sound output step (S42) of outputting sounds from sound output means (2a) in accordance with the operation input from the input device while the composition is being played and while the playing of the composition is temporarily stopped in the middle of the composition, in the composition playing step. In the replay data generating step, the second replay data may be generated, including time information (FIG. 21) indicating a timing of outputting each of the sounds outputted in the sound output step and is stored in the storage means. Regarding the sounds outputted in the sound output step while the composition is being played, intra-composition position information ("Composition Position" in FIG. 21) indicating at which position in the composition each sound is outputted may be stored as the time information, and regarding the sounds outputted in the sound output step while the playing of the composition is temporarily stopped, intra-temporarily-stopped-period position information ("Performance-Stopped-Period Position" in FIG. 21) indicating how long after the playing of the composition has stopped each sound is outputted may be stored as the time information, in addition to the intra-composition position information.

The intra-composition position information may be represented by a tick value, which is a unit of time for reproduction control of the composition data. The intra-temporarily-stopped-period position information may be represented by the number of frames or a real time.

The time information may be represented by (N+M) digit numerical data, of which N (N is an integer equal to or greater than 1) high-order digits indicate a value of the intra-composition position information and M (M is an integer equal to or greater than 1) low-order digits indicate a value of the intra-temporarily-stopped-period position information (FIG. 21).

The game program may further cause the computer to execute a game processing selecting step (S33) of selecting either reproduction-speed-variable processing (processing executed when a user selects a conductor part) for reproducing, based on the first replay data, playing of a composition, performed in the first game processing and also changing a tempo of the reproduced playing in accordance with the current operation input from the input device or reproduction-speed-invariable processing (processing executed when the user selects a part other than the conductor part) for reproducing, based on the first replay data and at the same tempo as when the first replay data has been generated, the playing of the composition, performed in the first game processing. In the game processing step, the processing selected from the reproduction-speed-variable processing and the reproduction-speed-invariable processing, in the game processing selecting step, may be executed as the second game processing.

The game processing step may include: a composition playing step (S51, S73) of playing a composition based on composition data stored in the storage means and/or the first replay data read from the storage means in the replay data reading step; a performance image output step (S19) of, in accordance with the playing of the composition played in the composition playing step, generating a performance image (FIG. 9) including virtual world musicians (C1, C2, C3, C4, C5) that is captured from a virtual camera, and outputting the generated performance image to a display device (2); and a camera parameter setting step (S91) of setting various parameters of the virtual camera in accordance with the operation input from the input device. In the replay data generating step, the second replay data may be generated, including setting history information (123g) of the various parameters of the virtual camera that are set in the camera parameter setting step, and may be stored in the storage means.

The game processing may include a process of performing an ensemble of a composition by means of a plurality of parts (melody 1, melody 2, bass, chord, percussion) based on the first replay data and the operation input from the input device, and the first replay data may include musical performance data (123a, 123b, 123c, 123d, 123e) regarding one or more parts. The game program may further cause the computer to execute a part selecting step (S33) of selecting a part to be played in accordance with the operation input from the input device. When the musical performance data regarding the part selected in the part selecting step is included in the first replay data: in the game processing step, the selected part may be played in accordance with the operation input from the input device; and in the replay data generating step, the second replay data may be generated by updating the musical performance data regarding the selected part that is included in the first replay data (S38).

A game apparatus (3) of the present invention is a game apparatus for storing replay data (123) for reproducing game processing executed based on an operation input from an input device (7) in storage means (12). The game apparatus includes: the input device; the storage means; replay data reading means (10, S50) for reading, from the storage means, first replay data (123), generated based on the operation input from the input device and stored in the storage means when first game processing has been executed earlier, for reproducing the first game processing; game processing means (10, S42, S51) for executing second game processing based on both the first replay data read from the storage means by the replay data reading means and the current operation input from the input device; and replay data generating means (10, S43) for generating second replay data (123) for reproducing the second game processing executed by the game processing means and storing the generated second replay data in the storage means.

According to the present invention, when it is desired to use replay data in which a plurality of users simultaneously play a game, it is not necessary for the plurality of users to simultaneously play the game in order to generate the replay data, and thus it is possible to generate the replay data at a time and in a place convenient to each user, without temporal or spatial limitations. Additionally, since it is possible to generate replay data multiple times, a user, even if alone, can generate replay data in which the user plays the game as if simultaneously with a plurality of users.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view showing the controller 7 from the bottom front side thereof;

FIG. 11 shows an example of the method of operating the controller 7;

FIG. 12 shows an example of the acceleration detected when the controller 7 is swung;

FIG. 13 shows an example of the method of operating the controller 7;

FIG. 17 shows the data structure of composition data 122;

FIG. 18 shows a musical score corresponding to the composition data 122 of FIG. 17;

FIG. 19 shows the correspondence between the values of "Pitch" in the composition data 122 and piano keys;

FIG. 20 shows the data structure of history data 123;

FIG. 21 shows the details of the information of "Time" of the history data 123;

FIG. 22 shows a modification of the history data 123;

FIG. 31A is a diagram showing an example of the timing of storing pieces of performance event data; and FIG. 31B is a diagram showing an example of the timing of processing the pieces of performance event data.

DESCRIPTION OF THE PREFERRED EMBODIMENTS

With reference to the figures, various embodiments of the present invention will be described below.

First, an example of a hardware structure for carrying out the present invention will be described. Here, an example of applying the present invention to a game system will be described.

(Overall Structure of the Game System)

Figure 1:
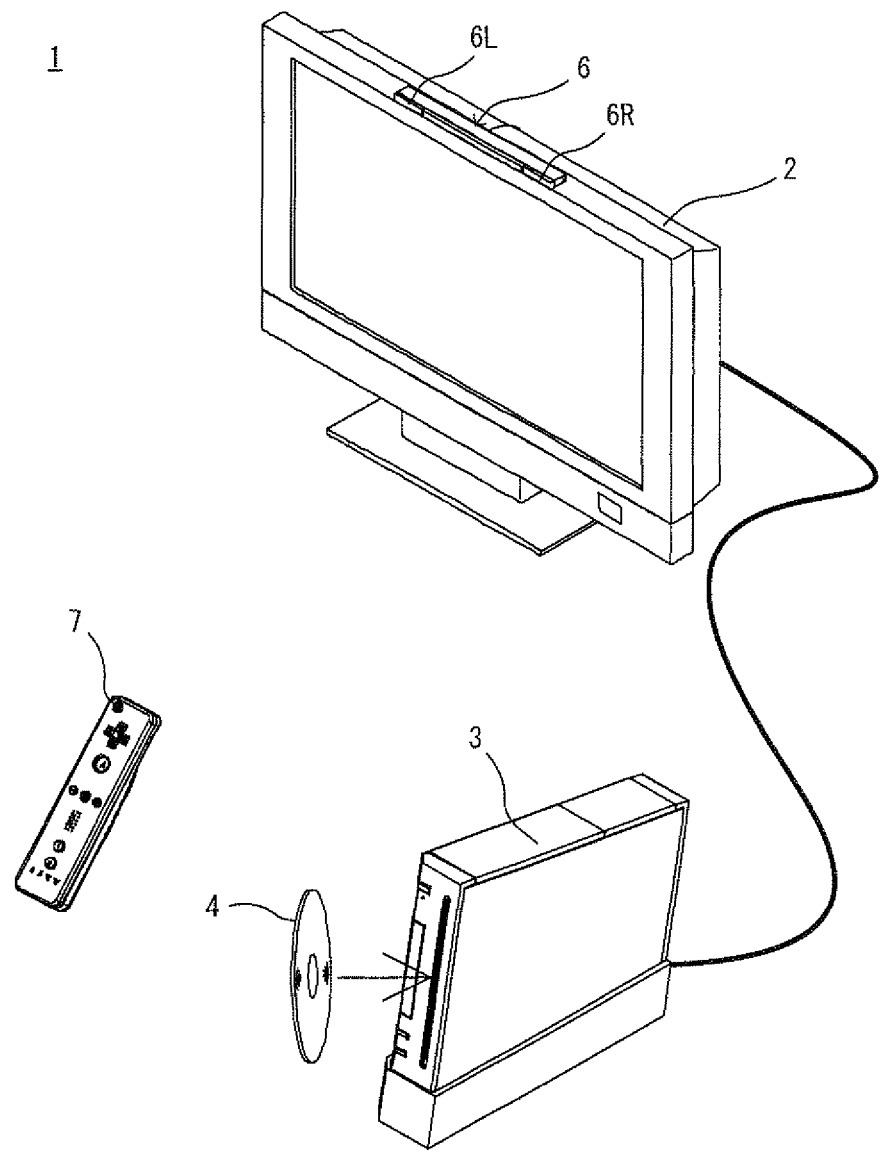
FIG. 1 is an external view of a game system 1 according to an embodiment of the present invention.

With reference to FIG. 1, a game system 1 including a game apparatus according to an embodiment of the present invention will be described. FIG. 1 is an external view of the game system 1. A game apparatus and a game program according to the present embodiment will be described below. In the following example, the game apparatus is a stationary game apparatus. Referring to FIG. 1, the game system 1 includes a TV receiver (hereinafter referred to simply as a "TV") 2, a game apparatus 3, an optical disc 4, a marker section 6, and a controller 7. In the game system 1, game processing is executed by the game apparatus 3 based on a game operation performed using the controller 7.

In the game apparatus 3, the optical disc 4 is detachably mounted as an example of an information storage medium exchangeably used for the game apparatus 3. The optical disc 4 has stored therein the game program to be executed by the game apparatus 3. The game apparatus 3 has an opening on the front surface thereof for mounting the optical disc 4. The game apparatus 3 reads and executes the game program stored in the optical disc 4 inserted into the opening, and thus executes the game processing.

The game apparatus 3 is connected to the TV 2 as an example of a display device via a connection cord. The TV 2 displays a game image obtained as a result of the game processing executed by the game apparatus 3. Further, the marker section 6 is provided in the vicinity of the display screen of the TV 2 (above the display screen in FIG. 1). The marker section 6 includes two markers 6R and 6L respectively at two ends thereof. Specifically, the marker 6R (also the marker 6L) includes one or more infrared LEDs, and outputs infrared light forward from the TV 2. The marker section 6 is connected to the game apparatus 3, and the game apparatus 3 can control each of the infrared LEDs included in the marker section 6 to be lit on or off.

The controller 7 is an input device for providing the game apparatus 3 with operation data representing the particulars of the operation performed thereon. The controller 7 and the game apparatus 3 are connected to each other via wireless communication. In the present embodiment, the controller 7 and the game apparatus 3 wirelessly communicate with each other by, for example, the Bluetooth (registered trademark) technology. Note that in another embodiment, the controller 7 and the game apparatus 3 may be connected to each other in a wired manner.

(Internal Structure of the Game Apparatus 3)

Figure 2:
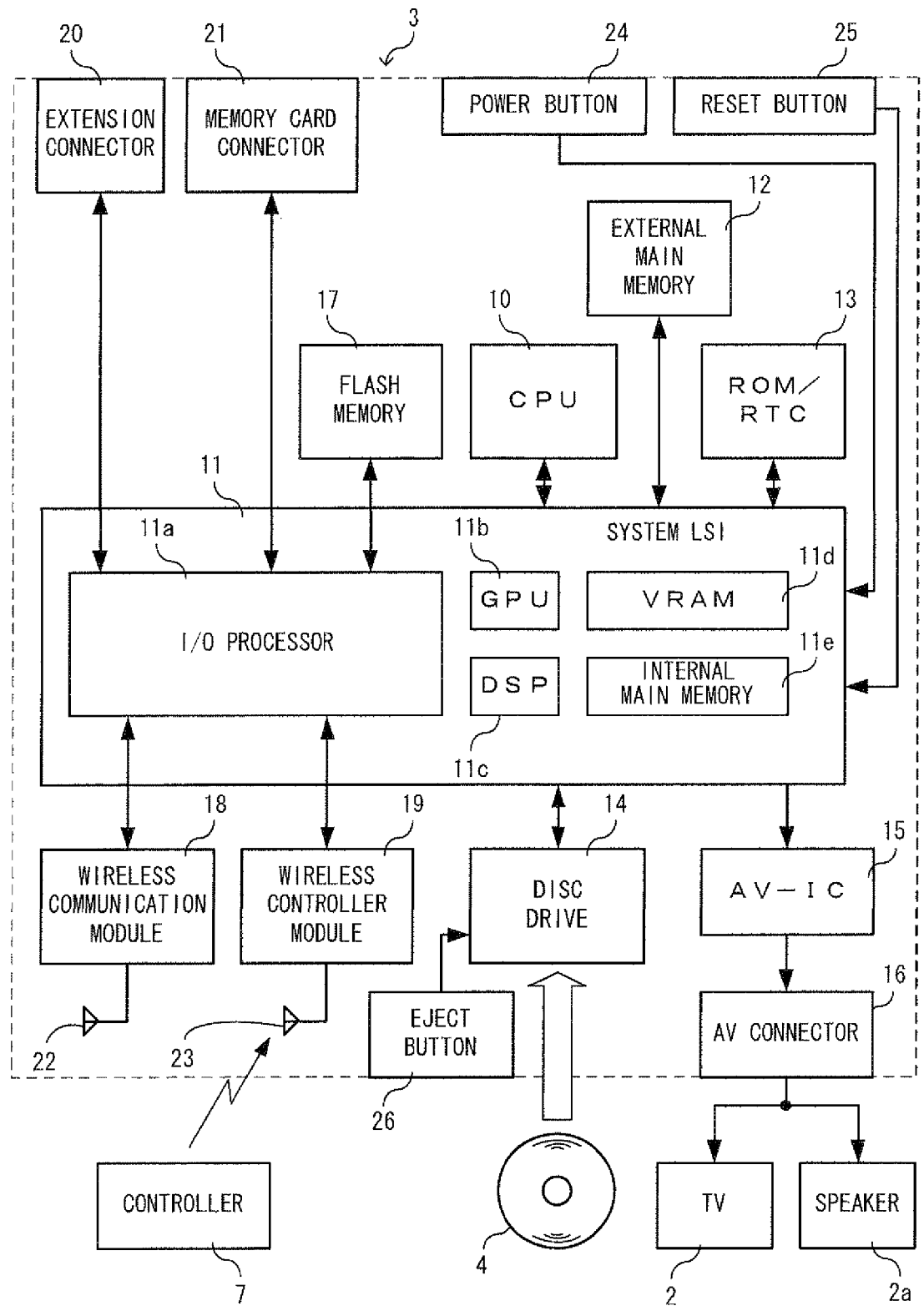
FIG. 2 is a block diagram showing the structure of a game apparatus 3.

Next, with reference to FIG. 2, the internal structure of the game apparatus 3 will be described. FIG. 2 is a block diagram showing the structure of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and acts as a game processor. The CPU 10 is connected to the system LSI 11. The system LSI 11 is connected to the CPU 10 and also to the external main memory 12, the ROM/RTC 13, the disc drive 14, and the AV-IC 15. The system LSI 11, for example, controls data transfer between the elements connected thereto, generates images to be displayed, and obtains data from external devices. The internal structure of the system LSI 11 will be described below. The external main memory 12, which is of a volatile type, stores therein programs including the game program read from the optical disc 4, the game program read from a flash memory 17, or various other data. The external main memory 12 is used as a work area or a buffer area of the CPU 10. The ROM/RTC 13 includes a ROM (a so-called boot ROM) having a program for starting the game apparatus 3 incorporated therein and a clock circuit (RTC: Real Time Clock) for counting time. The disc drive 14 reads program data, texture data, or the like from the optical disc 4, and writes the read data into an internal main memory 11e described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and an internal main memory 11e. Although not shown, these elements 11a through 11e are connected to one another via an internal bus.

The GPU 11b is a part of drawing means and generates an image in accordance with a graphics command (a command to draw an image) from the GPU 10. The VRAM 11d stores therein data (polygon data, texture data, etc.) necessary for the GPU 11b to execute the graphics command. The GPU 11b uses the data stored in the VRAM 11d to generate image data.

The DSP 11c acts as an audio processor and generates audio data using sound data or sound wave (sound tone) data stored in the internal main memory 11e or the external main memory 12

The image data and the audio data that have been generated as described above are read by the AV-IC 15. The AV-IC 15 outputs the read image data to the TV 2 via an AV connector 16, and also outputs the read audio data to a speaker 2a built in the TV 2. Thus an image is displayed on the TV 2 and also a sound is outputted from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an expansion connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, and thus can communicate with other game apparatuses or various servers also connected to the network. The input/output processor 11a periodically accesses the flash memory 17, and detects the presence or absence of data required to be transmitted to the network. When the data is present, the input/output processor 11a transmits the data to the network via the wireless communication module 18 and the antenna 22. The input/output processor 11a also receives data transmitted from other game apparatuses or data downloaded from a download server, via the network, the antenna 22, and the wireless communication module 18, and stores the received data in the flash memory 17. The CPU 10 executes the game program and thus reads the data stored in the flash memory 17 to be used for the game program. The flash memory 17 may have stored therein data (data stored after or during the game) saved as a result of playing the game using the game apparatus 3 as well as the data to be transmitted to, or the data received from, the other game apparatuses or various servers.

Further, the input/output processor 11a receives operation data transmitted from the controller 7 via the antenna 23 and the wireless controller module 19, and stores (temporarily stores) the operation data in a buffer area of the internal main memory 11e or the external main memory 12.

Furthermore, the input/output processor 11a is connected to the expansion connector 20 and the memory card connector 21. The expansion connector 20 is a connector for an interface such as USB or SCSI. The expansion connector 20 may be connected to a medium such as an external storage medium, may be connected to a peripheral device such as another controller, or may be connected to a wired communication connector, thereby communicating with the network instead of the wireless communication module 18 The memory card connector 21 is a connector for an external storage medium such as a memory card. For example, the input/output processor 11a can access an external storage medium via the expansion connector 20 or the memory card connector 21, and thus can store or read data.

The game apparatus 3 has a power button 24, a reset button 25, and an eject button 26. The power button 24 and the reset button 25 are connected to the system LSI 11 when the power button 24 is turned on, the elements of the game apparatus 3 are supplied with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

Figure 3:
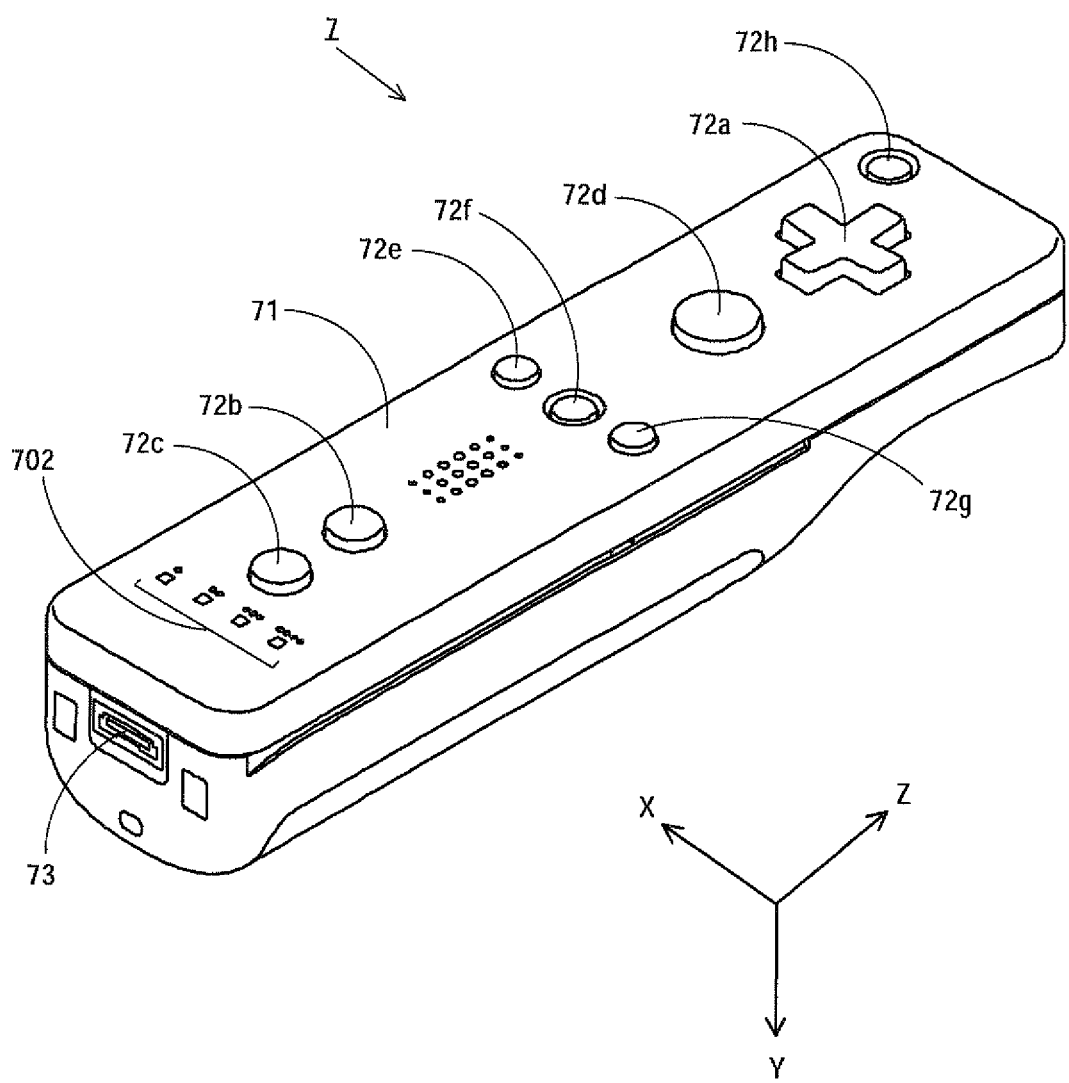
FIG. 3 is a perspective view showing a controller 7 from the top rear side thereof.

With reference to FIGS. 3 and 4, the controller 7 will be described. Note that FIG. 3 is a perspective view showing the controller 7 from the top rear side thereof. FIG. 4 is a perspective view showing the controller 7 from the bottom front side thereof.

Referring to FIGS. 3 and 4, the controller 7 includes a housing 71 formed by plastic molding or the like. The housing 71 has a plurality of operation sections 72. The housing 71 has a generally parallel piped shape extending in a longitudinal direction from front to rear. The overall size of the housing 71 is small enough to be held by one hand of an adult or even a child.

At the center of the front part of the top surface of the housing 71, a cross key 72a is provided. The cross key 72a is a cross-shaped four-direction push switch. The cross key 72a includes operation portions corresponding to the four directions (front, rear, right, and left), which are respectively located on cross-shaped projecting portions arranged at 90 degree intervals. The player selects one of the front, rear, right, and left directions by pressing one of the operation portions of the cross key 72a. Through an operation on the cross key 72a, the player can, for example, instruct a direction in which a player character or the like appearing in a virtual game world is to move, or select one of a plurality of options.

Note that although the cross key 72a is an operation section for outputting an operation signal in accordance with the above-described direction input operation performed by the player, such an operation section may be provided in another form. For example, the cross key 72a may be replaced with an operation section that has four push switches extending in four directions, respectively, to form a cross and outputs an operation signal in accordance with the player pressing one of the four push switches. Further, the cross key 72a may be replaced with an operation section that has the four push switches in combination with a center switch positioned at the center of the cross of the four push switches. Alternatively, the cross key 72a may be replaced with an operation section that includes an inclinable stick (a so-called joy stick) protecting from the top surface of the housing 71 and outputs an operation signal in accordance with the inclining direction of the stick. Still alternatively, the cross key 72a may be replaced with an operation section that includes a disc-shaped member horizontally slidable and outputs an operation signal in accordance with the sliding direction of the disc-shaped member. Still alternatively, the cross key 72a may be replaced with a touch pad.

Posterior to the cross key 72a on the top surface of the housing 71, a plurality of operation buttons 72b, 72c, 72d, 72e, 72f, and 72g are provided. The operation buttons 72b, 72c, 72d, 72e, 72f, and 72g are operation sections for outputting, when the player presses the heads of the buttons, operation signals assigned to the operation buttons 72b, 72c, 72d, 72e, 72f, and 72g, respectively. For example, the operation buttons 72b, 72c, and 72d are assigned functions of a first button, a second button, and an A-button, respectively. Further, for example, the operation buttons 72e, 72f, and 72g are assigned functions of a minus button, a home button, and a plus button, respectively The operation buttons 72a, 72b, 72c, 72d, 72e, 72f, and 72g are assigned various operation functions in accordance with the game program executed by the game apparatus 3. Note that referring to an example arrangement shown in FIG. 3, the operation buttons 72b, 72c, and 72d are arranged in a line at the center on the top surface of the housing 71 in the front-rear direction. Further, the operation buttons 72e, 72f, and 72g are arranged in a line in the left-right direction between the operation buttons 72b and 72d on the top surface of the housing 71. The operation button 72f has the top surface thereof buried in the top surface of the housing 71, so as not to be inadvertently pressed by the player.

Further, anterior to the cross key 72a on the too surface of the housing 71, an operation button 72h is provided. The operation button 72h is a power switch for remotely turning on/off power to the game apparatus 3. The operation button 72h also has the top surface thereof buried in the top surface of the housing 71, so as not to be inadvertently pressed by the player.

Further, posterior to the operation button 72c on the top surface of the housing 71, a plurality of LEDs 702 are provided. The controller 7 is assigned a controller type (number) so as to be distinguishable from the other controllers 7. For example, the LEDs 702 may be used to inform the player of the controller type currently set for the controller 7 that he/she is using. Specifically, when transmission data is transmitted from the controller 7 to the wireless communication module 18, one of the plurality of LEDs 702 that corresponds to the controller type is lit on.

Further, between the operation button 72b and the operation buttons 72e, 72f and 72g on the top surface of the housing 71, a sound hole for outputting a sound from a speaker (a speaker 706 shown in FIG. 5) described below to the outside is provided.

On the other hand, on the bottom surface of the housing 71, a recessed portion is formed. The recessed portion is formed at the position at which an index finger or a middle finger of the player is to be located when the player holds the controller 7 by one hand, orienting the front surface of the controller 7 toward the markers 6L and 6R. On a slope surface (on the rear surface side) of the recessed portion, an operation button 72i is provided. The operation button 72i is an operation section acting as, for example, a B-button.

Further, on the front surface of the housing 71, an image pickup element 743 included in an imaging information calculation section 74 is provided. The imaging information calculation section 74 is a system for analyzing image data captured by the controller 7, determining an area having a high brightness in the image data, and thus detecting the center of gravity, the size, and the like of the determined area. The imaging information calculation section 74 has, for example, a maximum sampling period of about 200 frames/sec., and thus can trace and analyze even a relatively fast motion of the controller 7. The imaging information calculation section 74 will be described in detail below. Further, on the rear surface of the housing 71, a connector 73 is provided. The connector 73 may be, for example, an edge connector, and is used to engage and connect with a connecting cable, for example.

Here, to make the following description specific, a coordinate system to be set for the controller 7 is defined. As shown in FIGS. 3 and 4, an X-axis, a Y-axis, and a Z-axis, which are orthogonal to one another, are defined for the controller 7. Specifically, the longitudinal direction of the housing 71 corresponding to the front-rear direction of the controller 7 is defined as a Z-axis direction, and a direction toward the front surface (a surface on which the imaging information calculation section 74 is mounted) of the controller 7 is defined as a Z-axis positive direction. Further, the up-down direction of the controller 7 is defined as a Y-axis direction, and a direction toward the bottom surface (a surface on which the operation button 72i is provided) of the housing 71 is defined as a Y-axis positive direction. Furthermore, the left-right direction of the controller 7 is defined as an X-axis direction, and a direction toward the left side surface (a side surface not shown in FIG. 3 but shown in FIG. 4) of the housing 71 is defined as an X-axis positive direction.

Figure 5:
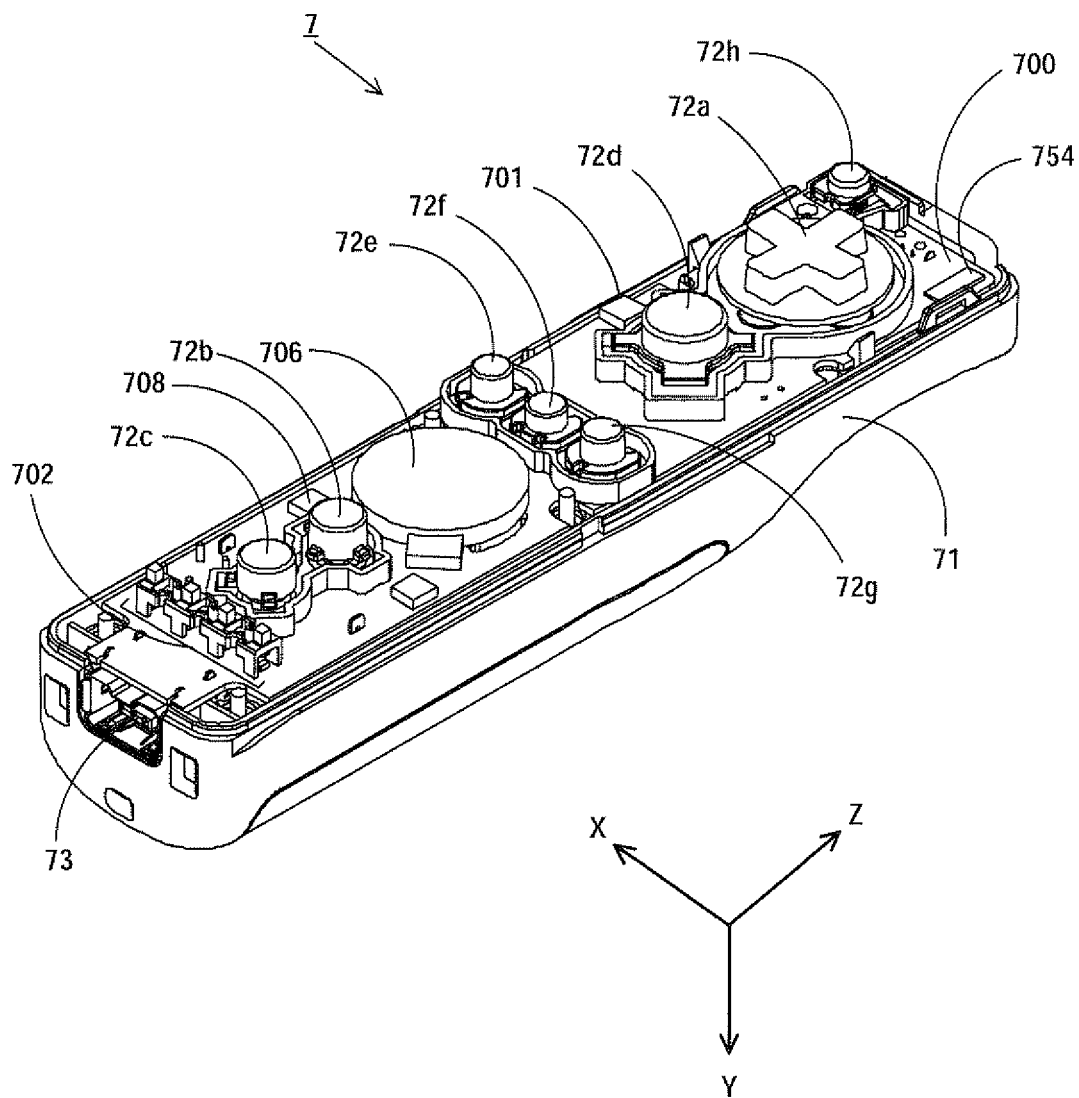
FIG. 5 is a perspective view showing a state where an upper casing of the controller 7 is removed.
Figure 6:
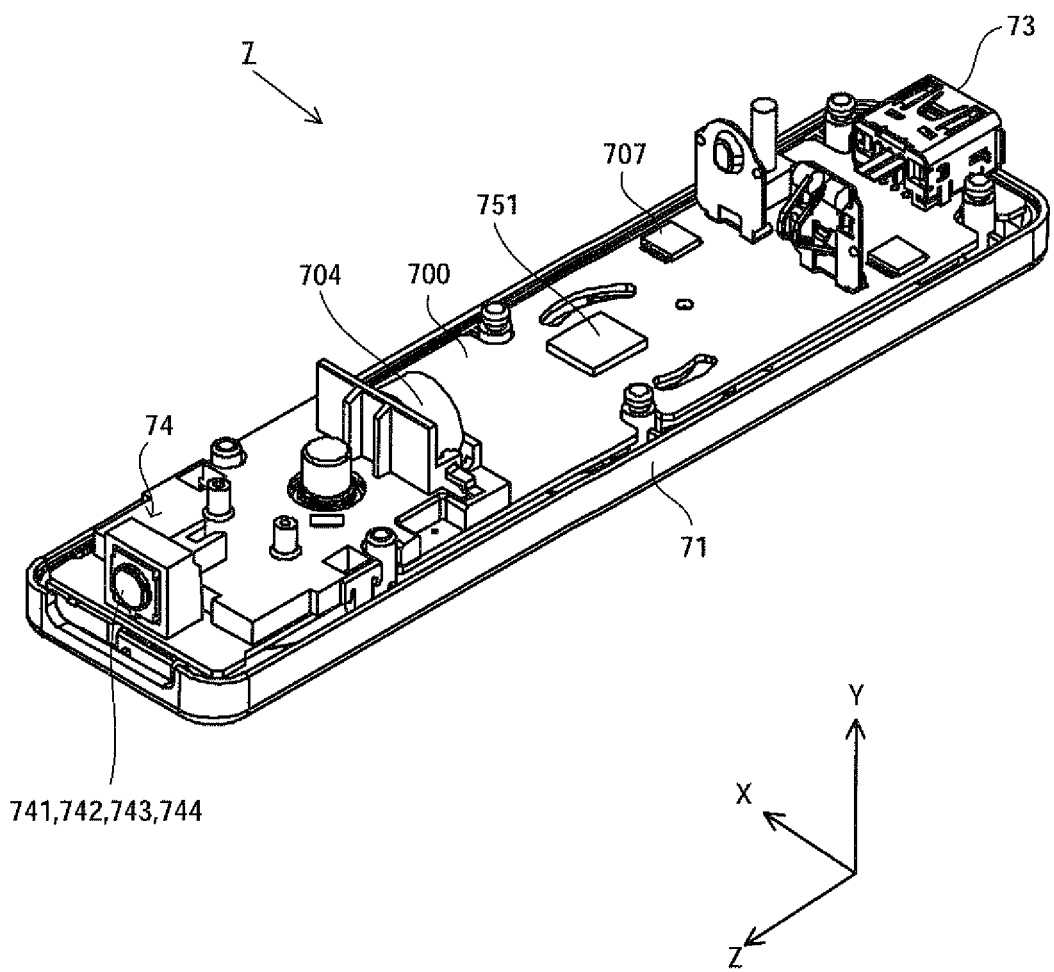
FIG. 6 is a perspective view showing a state where a lower casing of the controller 7 is removed.

Next, with reference to FIGS. 5 and 6, the internal structure of the controller 7 will be described. Note that FIG. 5 is a perspective view, from the top rear surface of the controller 7, showing a state where an upper casing (a part of the housing 71) of the controller 7 is removed. FIG. 6 is a perspective view, from the bottom front surface of the controller 7, showing a state where a lower casing (a part of the housing 71) of the controller 7 is removed. FIG. 6 is a perspective view showing the reverse side of a substrate 700 shown in FIG. 5.

Referring to FIG. 5, the substrate 700 is fixed within the housing 71. On the top main surface of the substrate 700, the operation buttons 72a, 72b, 72c, 72d, 72e, 72f, 72g and 72h, an acceleration sensor 701, the LEDs 702, an antenna 754, and the like are provided. These elements are connected to a microcomputer 751 (see FIGS. 6 and 7) and the like via lines (not shown) formed on the substrate 700 and the like. Further, a wireless module 753 (see FIG. 7) and the antenna 754 allow the controller 7 to act as a wireless controller. Note that a quartz oscillator 703 (not shown), which is provided within the housing 71, generates a reference clock of the microcomputer 751 described below. On the top main surface of the substrate 700, the speaker 706 and an amplifier 708 are provided. Furthermore, the acceleration sensor 701 is provided on the substrate 700 to the left of the operation button 72d (i.e., provided not in the center portion but in the peripheral portion of the substrate 700). Accordingly, in accordance with the rotation of the controller 7 around the axis of the longitudinal direction thereof, the acceleration sensor 701 can detect acceleration containing a centrifugal force component, as well as a directional change of gravity acceleration. Therefore, by performing a predetermined calculation, the game apparatus 3 and the like can determine the rotation of the controller 7 based on the detected acceleration data with excellent sensitivity.

On the other hand, referring to FIG. 6, at the front edge of the bottom main surface of the substrate 700, the imaging information calculation section 74 is provided. The imaging information calculation section 74 includes an infrared filter 741, a lens 742, the image pickup element 743, and an image processing circuit 744, located in order starting from the front surface of the controller 7 and attached on the bottom main surface of the substrate 700. At the rear edge of the bottom main surface of the substrate 700, the connector 73 is attached. Further, on the bottom main surface of the substrate 700, a sound IC 707 and the microcomputer 751 are provided. The sound IC 707, connected to the microcomputer 751 and the amplifier 708 via the line formed on the substrate 700 and the like, outputs a sound signal to the speaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704, connected to the microcomputer 751 via the line formed on the substrate 700 and the like, is powered on/off in accordance with vibration data transmitted from the game apparatus 3. The controller 7 is vibrated by an actuation of the vibrator 704, and the vibration is conveyed to the player's hand holding the controller 7. Thus a so-called vibration-feedback game can be realized. Since the vibrator 704 is located slightly forward with respect to the center of the housing 71, a large vibration of the housing 71 allows the player holding the controller 7 to easily feel the vibration.

Next, with reference to FIG. 7, the internal structure of the controller 7 will be described. Note that FIG. 7 is a block diagram showing the structure of the controller 7.

Figure 7:
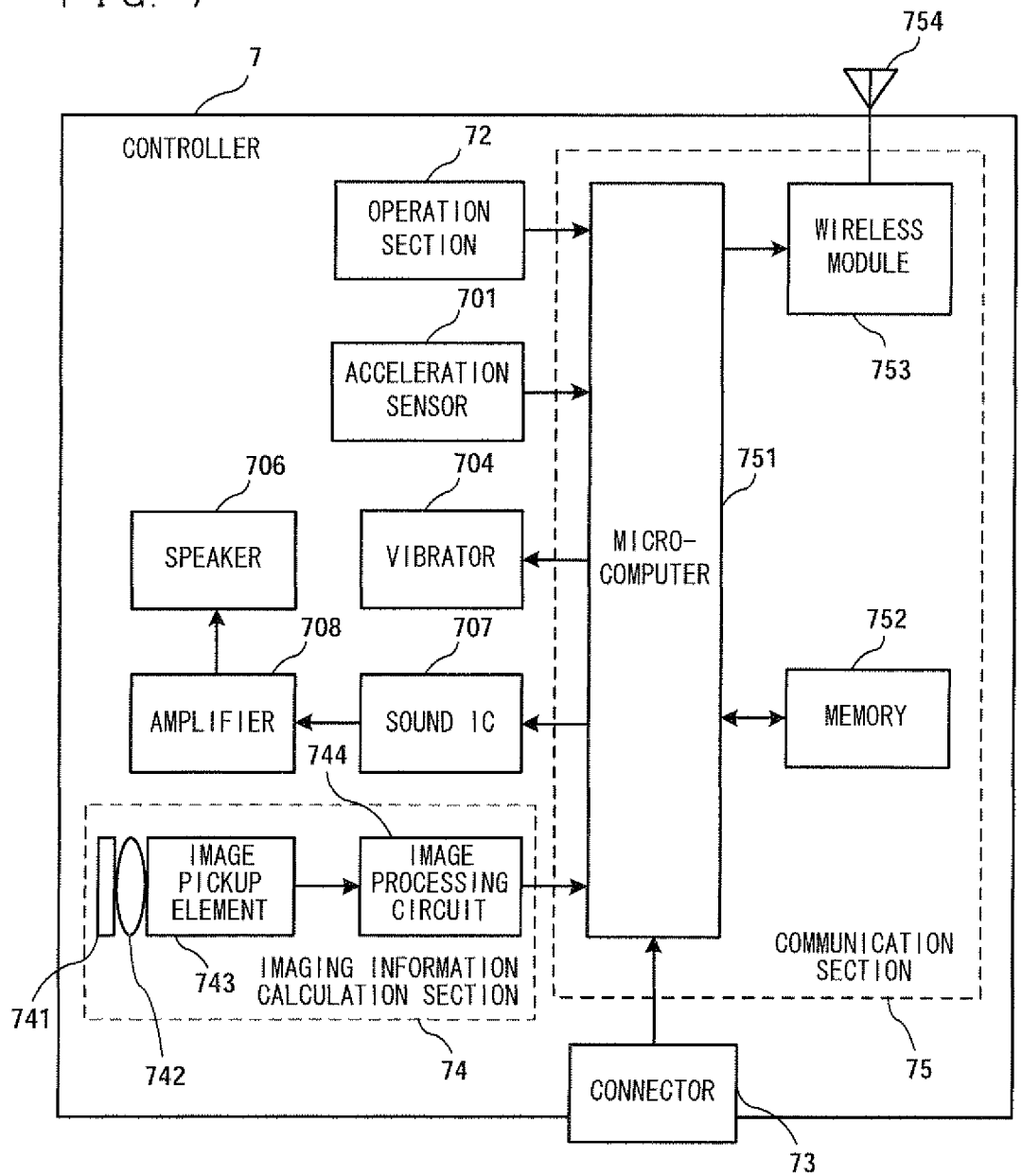
FIG. 7 is a block diagram showing the structure of the controller 7.

Referring to FIG. 7, the controller 7 includes a communication section 75, in addition to the operation sections 72, the imaging information calculation section 74, the acceleration sensor 701, the vibrator 704, the speaker 706, the sound IC 707, and the amplifier 708, which are described above.

The imaging information calculation section 74 includes the infrared filter 741, the lens 742, the image pickup element 743, and the image processing circuit 744. The infrared filter 741 allows, among light incident on the front surface of the controller 7, only infrared light to pass therethrough. The lens 742 collects the infrared light having passed through the infrared filter 741, and emits the infrared light to the image pickup element 743. The image pickup element 743 is a solid-state image pickup device such as a CMOS sensor or a CCD. The image pickup element 743 captures the infrared light collected by the lens 742. Accordingly, the image pickup element 743 captures only the infrared light having passed through the infrared filter 741, and thus generates image data. The image data generated by the image pickup element 743 is processed by the image processing circuit 744. Specifically, the image processing circuit 744 processes the image data obtained by the image pickup element 743, senses an area thereof having a high brightness, and outputs the process result data representing the detection result of the position coordinates and the size of the area, to the communication section 75. Note that the imaging information calculation section 74 is fixed to the housing 71 of the controller 7, and therefore the capturing direction of the imaging information calculation section 74 can be changed by changing the direction of the housing 71 per se.

It is preferable that the controller 7 includes a three-axial (X-axis, Y-axis, and Z-axis) acceleration sensor 701. The three-axial acceleration sensor 701 senses linear accelerations in three directions, i.e., the up-down direction (the Y-axis shown in FIG. 3), the left-right direction (the X-axis shown in FIG. 3), and the front-rear direction (the Z-axis shown in FIG. 3).

The communication section 75 includes the microcomputer 751, a memory 752, the wireless module 753, and the antenna 754. Using the memory 752 as a storage area during the process, the microcomputer 751 controls the wireless module 753 for wirelessly transmitting transmission data. Further, the microcomputer 751 controls the operations of the sound IC 707 and the vibrator 704, based on data received by the wireless module 753 from the game apparatus 3 via the antenna 754. The sound IC 707 processes sound data and the like transmitted from the game apparatus 3 via the communication section 75. Furthermore, the microcomputer 751 actuates the vibrator 704 based on, for example, vibration data (e.g., a signal for powering the vibrator 704 on/off) transmitted from the game apparatus 3 via the communication section 75.

Data from the controller 7 including an operation signal (key data) from the operation section 72, three-axial direction acceleration signals (X-axis, Y-axis and Z-axis direction acceleration data) from the acceleration sensor 701, and the process result data from the imaging information calculation section 74 is outputted to the microcomputer 751. The microcomputer 751 temporarily stores, in the memory 752, the respective data (the key data, the X-axis, Y-axis and Z-axis direction acceleration data, and the process result data) as transmission data to be transmitted to the wireless communication module 18. The wireless transmission from the communication section 75 to the wireless communication module 18 is performed periodically at predetermined time intervals. Since game processing is generally executed in a cycle of ⅙₀ sec., the wireless transmission is required to be performed in a shorter cycle time. Specifically, the game processing unit is 16.7 ms (⅙₀ sec.), and the transmission interval of the communication section 75 structured using the Bluetooth (registered trademark) technology is 5 ms. At the time of performing transmission to the wireless communication module 18, the microcomputer 751 outputs the transmission data stored in the memory 752 to the wireless module 753, as a series of operation information. With the use of, for example, the Bluetooth (registered trademark) technology, the wireless module 753 radiates the operation information as an electric wave signal thereof from the antenna 754, using a carrier wave of a predetermined frequency. That is, the data from the controller 7 including the key data from the operation section 72, the X-axis, Y-axis and Z-axis direction acceleration data from the acceleration sensor 701, and the process result data from the imaging information calculation section 74 is transmitted from the controller 7. The wireless communication module 18 of the game apparatus 3 receives the electric wave signal, and the game apparatus 3 demodulates or decodes the electric wave signal, thereby obtaining the series of the operation information (the key data, X-axis, Y-axis and Z-axis direction acceleration data, and the process result data). Based on the obtained operation information and the game program, the CPU 10 of the game apparatus 3 executes the game processing. Note that when structured using the Bluetooth (registered trademark) technology, the communication section 75 can also have a function of receiving transmission data wirelessly transmitted from other devices.

Note that the above-described hardware structure is provided only for illustrative purposes, and the present invention can also be applied to any arbitrary computer system.

Next, an overview of game processing executed in the present embodiment will be described. In the present embodiment, the CPU 10 executes a game program (a music performance program) loaded into the external main memory 12 (or the internal main memory 11e) from the optical disc 4 or the like, whereby a music performance game is executed. In the music performance game, the user can play an instrument, conduct an ensemble, and operate a camera, all by operating the controller 7.

Figure 8:
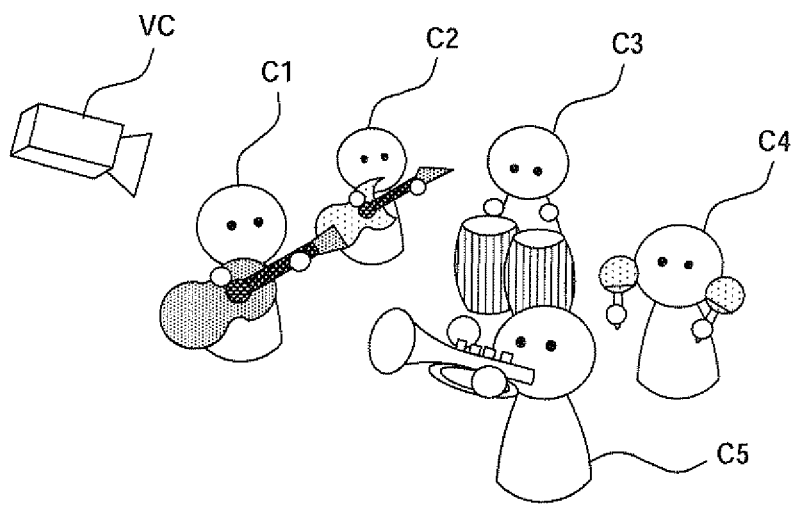
FIG. 8 shows an example of a game space.
Figure 9:
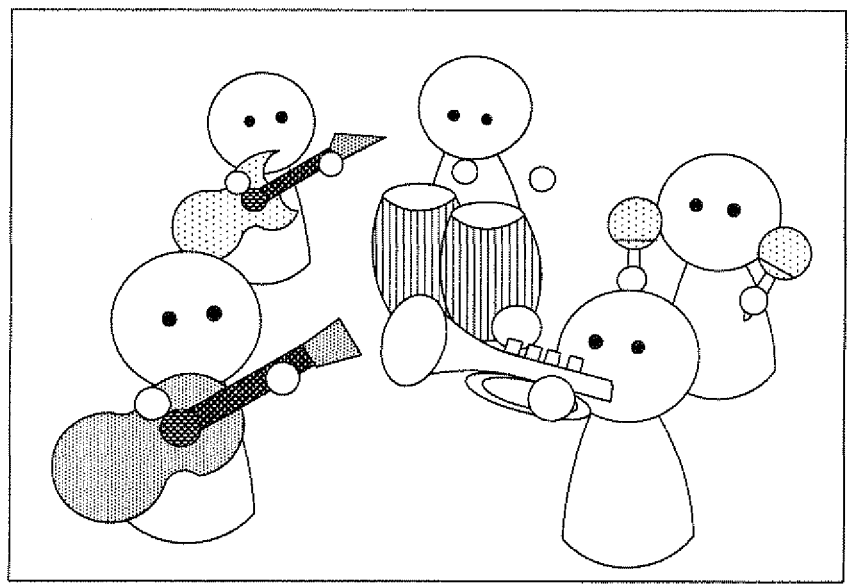
FIG. 9 shows an example of an image displayed on the display screen of a TV 2.

In the music performance game of the present embodiment, as shown in FIG. 8, a virtual camera VC and five characters C1, C2, C3, C4, and C5 (three-dimensional objects) are located in a virtual game space, and as shown in FIG. 9, an image representing the appearance of the characters C1, C2, C3, C4, and C5 viewed from the virtual camera VC is generated by three-dimensional image processing and is displayed on the display screen of the TV 2. Thus the appearance of the characters C1, C2, C3, C4, and C5 performing an ensemble is displayed on the display screen of the TV 2. Note that in addition to the five characters C1, C2, C3, C4, and C5 playing instruments, a character representing a conductor may be located in the virtual game space.

Figure 10:
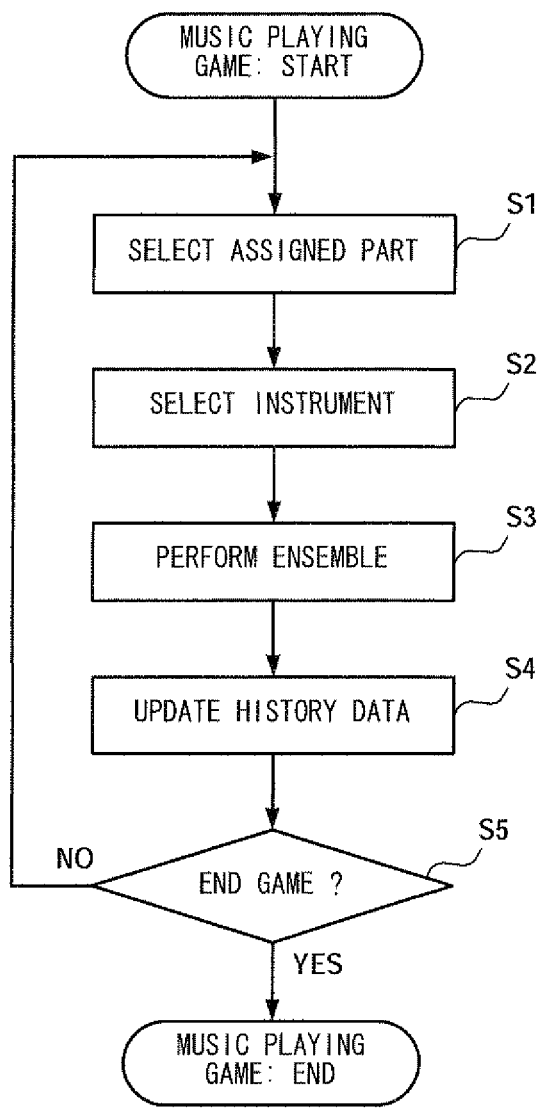
FIG. 10 is a flow chart showing a general flow of a music performance game.

With reference to a flow chart shown in FIG. 10, a general flow of the music performance game will be described below.

When the music performance game starts, prior to playing a composition, the user first operates the controller 7 and selects a part (hereinafter referred to as an "assigned part") to be assigned to himself/herself from seven parts (melody 1, melody 2, bass, chord, percussion, conductor, camera) for performing an ensemble (step S1). Next, the user selects an instrument (a timbre) to use for the assigned part (step S2). Note that when the part selected by the user in step S1 is the conductor part or the camera part, step S2 is omitted.

When the selection of the assigned part and the selection of the instrument, as necessary, are completed, an ensemble starts (step S3). When the ensemble starts, the user can participate in the ensemble by performing an input operation corresponding to the assigned part. For example, when the assigned part is the melody 1 part, the user can output a sound corresponding to the melody 1 part from the speaker 2a by swinging the controller 7 or pressing a switch on the controller 7, in accordance with the composition outputted from the speaker 2a. As for the parts other than the assigned part, the instruments are automatically played by a computer (e.g., the CPU 10) in accordance with composition data prepared in advance, and the sounds of the instruments are outputted from the speaker 2a. Note that the composition data used may be, for example, composition data (herein referred to simply as "MIDI data") compliant to the MIDI (Musical Instrument Digital Interface) standards. Needless to say, the sound data used may also be composition data of any other type. Note that examples of standard MIDI data include an SMF (Standard MIDI File).

Several specific examples of the method of operating the controller 7 during the ensemble will be described below.

FIG. 11 shows the method of operating the controller 7 when the user plays guitar. The user can play guitar (i.e., output the sound of guitar from the speaker 2a) by swinging the controller 7 down as if strumming the strings of a guitar. The loudness and the length of the sound outputted from the speaker 2a change depending on a swing strength and a swing sharpness, respectively, that are obtained when the user swings the controller 7 down. That is, the stronger the swing, the louder the outputted sound, and the sharper the swing, the shorter the outputted sound. Note that this method is merely illustrative, and instead of the length, the tone of the sound may change depending on the swing sharpness. The swing strength and the swing sharpness are determined based on the output from the acceleration sensor 701 provided in the controller 7. FIG. 12 shows the change of the output from the acceleration sensor 701 in the case where the user swings the controller 7. In the present embodiment, the swing strength is determined based on the maximum value of the acceleration, and the swing sharpness is determined based on the steepness (i.e., the magnitude of the change of acceleration per unit time) of the portion surrounded by a dashed circle in FIG. 12. Note that the pitch of the sound outputted from the speaker 2a is, in accordance with the composition data prepared in advance, determined based on the timing of the user swinging the controller 7 down. Note that the pitch of the sound may be determined based on the state (i.e., which button is being pressed) of the operation section 72 provided in the controller 7.

FIG. 13 shows the method of operating the controller 7 when the user plays trumpet. The user can play trumpet (i.e., output the sound of trumpet from the speaker 2a) by holding the controller 7 as if holding a trumpet, and thus by operating (e.g., pressing a button) the operation section 72 provided in the controller 7. The loudness of the sound outputted from the speaker 2a changes depending on the orientation of the controller 7. Specifically, as shown in FIG. 13, based on an angle θ between a horizontal plane and the long axis of the controller 7, the further upward the front end of the controller 7 is directed, the louder the outputted sound, and the further downward the front end of the controller 7 is directed, the softer the outputted sound. The length of the sound outputted from the speaker 2a changes depending on the length of pressing down the button. Note that the pitch of the sound outputted from the speaker 2a is, in accordance with the composition data prepared in advance, determined based on the timing of the user pressing the button on the controller 7. Note that the pitch of the sound may change depending on which button on the controller 7 has been pressed.

Figure 14:
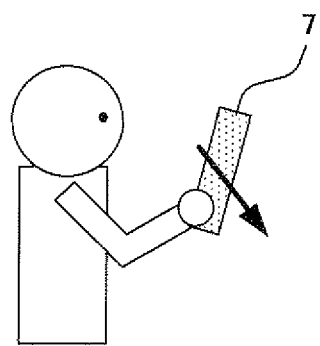
FIG. 14 shows an example of the method of operating the controller 7.
Figure 15:
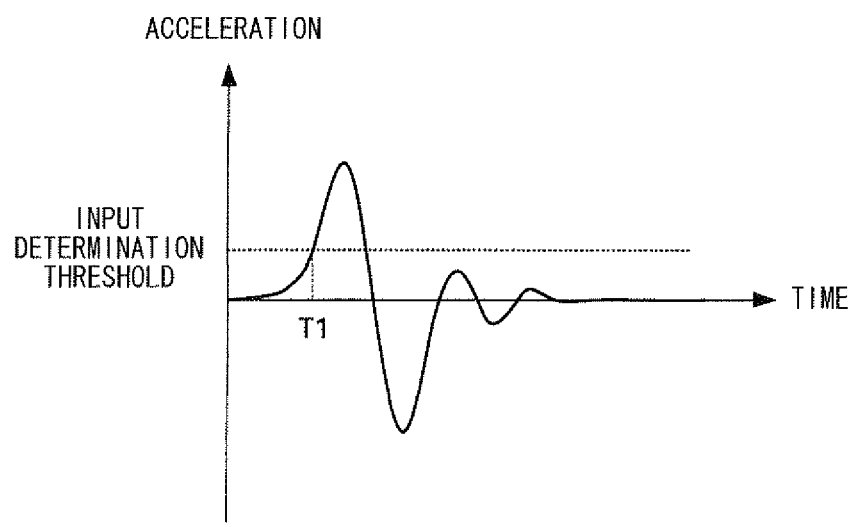
FIG. 15 shows an example of the acceleration detected when the controller 7 is swung.

FIG. 14 shows the method of operating the controller 7 when the user's assigned to the conductor part. The user can conduct the ensemble (i.e., control the tempo of the playing of the composition) by swinging the controller 7 from side to side or up and down as if swinging a baton. For example, each time the user swings the controller 7 down, one beat of the composition is played. Therefore, the ensemble continues while the user's swinging the controller 7 in a constant cycle, but when the user temporarily stops swinging the controller 7 in the middle of the composition, the ensemble is also stopped accordingly (i.e., the playing of the composition does not progress). When the user starts swinging the controller 7 again thereafter, the ensemble also starts accordingly. Further, the tempo of the performance of the ensemble changes depending on the cycle of the user swinging the controller 7. That is, the longer the cycle of swinging the controller 7, the slower tempo the ensemble is performed at, and the shorter the cycle of swinging the controller 7, the faster tempo the ensemble is performed at. Note that, as shown in FIG. 15, it is possible to determine whether or not the user has swung the controller 7, based on whether or not the acceleration of the controller 7 has exceeded an input determination threshold. In an example of FIG. 15, it is detected at T1 that the user has swung the controller 7.

Note that when the user's assigned to the camera part, it is possible to change the position, the orientation, or the zoom of the virtual camera VC, by operating the operation section 72 provided in the controller 7.

While the ensemble is being performed, the movements of the characters C1, C2, C3, C4, and C5 are controlled and a moving image of the characters C1, C2, C3, C4, and C5 playing instruments is displayed on the display screen of the TV 2. Further, concurrently, history data representing the user's musical performances (or the user's conducting or the user's camera control), in chronological order, at the time of the ensemble is generated and stored in the external main memory 12 (or the internal main memory 11e) (step S4). Note that when the history data is already present in the external main memory 12, the history data already present is updated.

When the ensemble ends, the user can select whether to continue or end the game (step S5). When the user continues the game, it is possible to play again, changing assigned parts and instruments as necessary. At this time, as for the part currently selected by the user, it is possible, as described above, to play the instrument, conduct the ensemble, or control the camera, based on the user's operation on the controller 7. Of the other six parts, the parts that the user has selected in the past are played (or the ensemble is conducted or the camera is controlled) automatically based on the history data stored in the external main memory 12 (i.e., the user's past musical performances are reproduced by the computer).

For example, when, after selecting the melody 1 part and playing its instrument, the user subsequently selects the melody 2 part and plays its instrument: the instrument of the melody 1 part is played based on the history data; the instrument of the melody 2 part is played based on the user's operation on the controller 7; and the instruments of the other parts are automatically played by the computer in accordance with the composition data prepared in advance. At this time, the history data is updated to reflect the user's musical performances of the melody 2 part. That is, the history data reflects the user's musical performances of both the melody 1 part and the melody 2 part. When the user, still subsequently, selects the percussion part and plays its instrument: the instruments of the melody 1 part and the melody 2 part are played based on the history data; the instrument of the percussion part is played based on the user's operation on the controller 7; and the instruments of the other parts are automatically played by the computer in accordance with the composition data prepared in advance. At this time, the history data is updated to reflect the user's musical performances of the percussion part. That is, the history data reflects the user's musical performances of the melody 1 part, the melody 2 part, and the percussion part. Thus, by changing assigned parts and repeating performances, the user can enjoy performing the ensemble even when playing the game alone.

Note that when the user re-selects a part that he/she has once selected, this re-selected part is played not based on the history data but based on the current input from the controller 7. Therefore, when the user finishes playing the instrument of a certain part but is dissatisfied with the finished musical performances, the user can select the same part and play the same instrument again, and thus can update the musical performances of the re-selected part in the history data.

Note that similarly, when the user selects the conductor part or the camera part, it is also possible to allow the history data to reflect the particulars of the user's operation (the user's conducting or the user's camera control, respectively) at that time. For example, when, after selecting the conductor part and conducting the ensemble by operating the controller 7 such that the tempo of the ensemble gradually becomes faster, the user changes the assigned part to the melody 1 part and performs the ensemble, the user's required to play the instrument of the melody 1 part in accordance with the tempo gradually becoming faster, since the ensemble is conducted based on the history data.

As described above, in the music performance game of the present embodiment, by changing assigned parts and repeating an ensemble, the user can play the instruments (or conduct the ensemble or control the camera) of all of the seven parts (melody 1, melody 2, bass, chord, percussion, conductor, camera) based on his/her own operation and complete the ensemble alone.

Note that although in the above description, one user plays the music performance game, it is also possible that a plurality of users, assigned to parts different from each other, perform an ensemble. For example, two users may simultaneously play two parts by separately operating two controllers 7. Alternatively, two users may alternately play parts in such a manner that after one user plays a certain part, the other subsequently plays another part.

Next, the process performed by the CPU 10 based on the music performance program of the present embodiment will be described in detail below.

Figure 16:
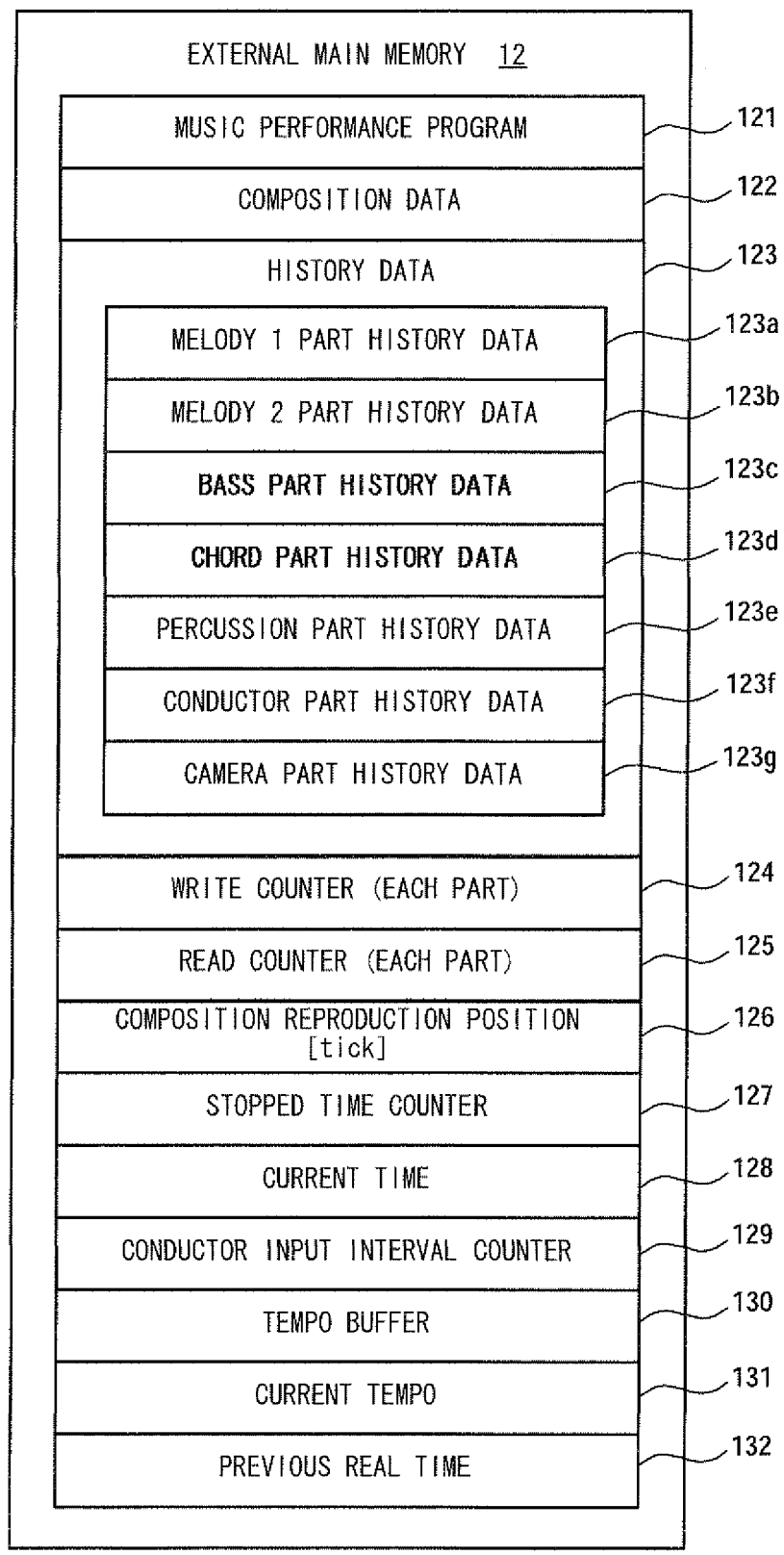
FIG. 16 shows a memory map of an external main memory 12.

FIG. 16 shows an example of a memory map of the external main memory 12.

A music performance program 121 is a computer program for causing the CPU 10 to execute the above-described music performance game.

Composition data 122 is data used for the computer (e.g., the CPU 10) to automatically play the instruments of the parts other than the assigned part as described above, and is MIDI data in the present embodiment. In the composition data 122, a plurality of sounds included in the composition are managed on one or more tracks. That is, each sound included in the composition belongs to one of the tracks. Here, the number of the tracks is up to 16. The composition data 122 is represented as a collection of a plurality of MIDI events The MIDI events include various MIDI events, such as "Note Event" for producing a sound, "Control Change Event" for changing the volume of a sound or a timbre on a track-by-track basis, "Pitch Bend Event", and "Program Change Event".

FIG. 17 shows an example of the composition data 122. Note that FIG. 17 shows, of all of the MIDI events, only "Note Event" for ease of description. In practice, however, the composition data 122 includes not only "Note Event" but also other MIDI events. Referring to FIG. 17, each row corresponds to one note event. The composition data 122 of FIG. 17 corresponds to a musical score of FIG. 18. "Track" is information indicating which track includes a sound produced by the one note event. "Reproduction Timing" is information indicating the timing of producing the sound and is expressed in ticks. In the present embodiment, it is assumed that one tick corresponds to one forty-eighth of the length of a quarter note. "Note Length (Duration)" is information indicating the length of the sound and is expressed in ticks. "Pitch (Note Number)" is, literally, information indicating a pitch, which is the pitch of the sound. FIG. 19 shows the correspondence between the values of pitch in the composition data 122 and piano keys. "Velocity" is information indicating the intensity of the sound. Note that "Note Event" may include further information, as well as the parameters shown in FIG. 17.

The composition data 122 can reproduce the composition, using application software referred to as a MIDI player. The MIDI player, generally, reproduces the composition by processing the MIDI events included in the composition data 122, in sequential order starting from the beginning of the composition. Note that, with the use of an existing program library (herein referred to as a "composition data reproduction library") functioning as the MIDI player, it is possible to easily reproduce the composition based on the composition data 122, without newly generating a computer program for reproducing the composition data 122.

History data 123 is, as described above, data indicating the user's musical performances (or the user's conducting or the user's camera control) at the time of the ensemble. In the present embodiment, the history data 123 is managed on a part-by-part basis. That is, the history data 123 includes melody 1 part history data 123*a*, melody 2 part history data 123*b*, bass part history data 123*c*, chord part history data 123*d*, percussion part history data 123*e*, conductor part history data 123*f*, and camera part history data 123*g*.

FIG. 20 shows an example of the history data 123 (e.g., the melody 1 part history data 123*a*). The history data 123 is constructed as a collection of a plurality of pieces of performance event data, stored in chronological order. Each piece of performance event data includes five pieces of information of "Time", "Input Button", "Volume", "Swing Sharpness", and "Instrument Type".

For example, when the user, assigned to the melody 1 part, plays guitar, a new piece of performance event data is generated each time the user swings the controller 7 down and is sequentially added to the melody 1 part history data 123*a*.

The information of "Time" of the history data 123 indicates the timing of producing a sound (or the timing of swinging the baton in the case of the conductor part history data 123*f*, or the timing of changing the position or the like of the camera in the case of the camera part history data 123*g*) and is represented by a value of 4 bytes in total. As shown in FIG. 21, the two high-order bytes of the value of "Time" indicate the position (the number of ticks counted from the beginning of the composition) in the composition, and the two low order bytes indicate the position (the number of elapsed frames since the performance has stopped) during the performance having stopped.

As described above, when the user's assigned to the conductor part, for example, each time the user swings the controller 7 down, one beat of the composition is played. Therefore, the ensemble continues while the user's swinging the controller 7 in a constant cycle, but when the user temporarily stops swinging the controller 7 in the middle of the composition, the ensemble is also stopped accordingly. In the present embodiment, the user can produce the sound of an instrument even while the ensemble pauses as described above. For example, when the user, assigned to the conductor part, stops the ensemble between a third bar and a fourth bar from the beginning of the composition for only three seconds and then starts the ensemble again, the conductor part history data 123*f* is updated to reflect the above-described performances. When the user, assigned to the melody 1 part, plays guitar thereafter, the ensemble stops between the third bar and the fourth bar from the beginning of the composition for only three seconds based on the updated conductor part history data 123*f*, but if the user swings the controller 7 down during the ensemble thus having stopped, the user can output the sound of guitar from the speaker 2*a*. For example, when the sound of guitar is produced 40 frames after the ensemble stops between the third bar and the fourth bar from the beginning of the composition, the number of ticks that indicates the end of the third bar from the beginning of the composition is stored in the two high-order bytes of the value of "Time" of the piece of performance event data most recently added to the melody 1 part history data 123*a*, and "40" is stored in the two low-order bytes. In the case where guitar is automatically played based on the melody 1 part history data 123*a* thus stored, the ensemble stops when the third bar from the beginning of the composition finishes, and the sound of guitar is produced 40 frames thereafter.

As described above, in the present embodiment, in the history data 123, "Time" indicating the timing of producing a sound is stored in the combination of "Composition Position" (the position in the composition) and "Performance-Stopped-Period Position" (the position during the performance having stopped). Since "Composition Position" is stored in the history data 123, even if the tempo of the ensemble is changed in accordance with the user's conducting (the user's operation on the controller 7 when the user's assigned to the conductor part) when the user's past musical performances are being reproduced based on the history data 123, the user's past musical performances can be appropriately reproduced in accordance with the changed tempo. That is, for example, when guitar is automatically played based on a piece of history data that indicates that the sound of guitar is produced in the middle of the fourth bar from the beginning of the composition, this sound of guitar can certainly be produced in the middle of the fourth bar from the beginning of the composition, no matter how the tempo is changed by the user. Further, since "Performance-Stopped-Period Position" is stored in the history data 123, the above-described performances during the ensemble having temporarily stopped can be appropriately reproduced thereafter.

Note that in the present embodiment, "Composition Position" is represented by the number of ticks, but the present invention is not limited thereto. For example, "Composition Position" may be represented by information as to at which beat of which bar in sequential order the sound of the instrument is produced. Further, in the present embodiment, "Performance-Stopped-Period Position" is represented by the number of frames, but the present invention is not limited thereto. For example, "Performance-Stopped-Period Position" may be represented by the time (e.g., the number of seconds) elapsed since the performance has stopped.

The information of "Input Button" of the history data 123 indicates the state (e.g., which one of the plurality of buttons is being pressed) of the plurality of buttons provided on the controller 7.

The information of "Volume" of the history data 123 indicates the loudness of the sound. As described above, when the user plays guitar, the loudness of the sound outputted from the speaker 2*a* changes depending on the swing strength (see FIG. 12) obtained when the user swings the controller 7 down. Therefore, when the instrument is guitar, the value corresponding to the swing strength is stored as "Volume". Note that, as described above, when the user plays trumpet, the loudness of the sound outputted from the speaker 2*a* changes depending on the orientation of the controller 7. Therefore, when the instrument is trumpet, as shown in FIG. 13, the value corresponding to the angle θ between the horizontal plane and the long axis of the controller 7 is stored as "Volume".

The information of "Swing Sharpness" of the history data 123 indicates the swing sharpness (see FIG. 12) obtained when the user swings the controller 7 down.

The information of "Instrument Type" of the history data 123 indicates the type of instrument selected by the user. Note that, as described above, since it is not necessary to select an instrument for the conductor part or the camera part, it is not necessary to store the information of "Instrument Type" of the conductor part history data 123*f* or the camera part history data 123*g*.

Note that in the present embodiment, as shown in FIG. 16, the history data 123 is stored on a part-by-part basis, but the present invention is not limited thereto. As shown in FIG. 22, regardless of the parts, pieces of performance event data may be stored in chronological order. In this case, information of "Part" is added to each piece of performance event data, so as to indicate with which one of the parts each piece of performance event data is associated.

Referring back to FIG. 16, a write counter 124 is a counter indicating a write address used to add a new piece of performance event data to the history data regarding each part (123*a*, 123*b*, 123*c*, 123*d*, 123*e*, 123*f*, and 123*g*) and is prepared on a part-by-part basis.

A read counter 125 is a counter indicating a read address used to read a piece of performance event data to be processed next, from the history data regarding each part (123*a*, 123*b*, 123*c*, 123*d*, 123*e*, 123*f*, and 123*g*) and is prepared on a part-by-part basis.

A composition reproduction position 126 indicates the current reproduction position and is represented by the position (the number of ticks counted from the beginning of the composition) in the composition.

A stopped time counter 127 is a counter for, when the ensemble is temporarily stopped, counting the time (the number of frames) elapsed since the ensemble has stopped.

A current time 128 indicates the current "Time", and as shown in FIG. 21, is 4-byte data represented in the combination of "Composition Position" and "Performance-Stopped-Period Position" (i.e., the combination of the value of the composition reproduction position 126 and the value of the stopped time counter 127).

A conductor input interval counter 129 is a counter for counting the time interval between when the user, assigned to the conductor part, swings the controller 7 previously and when the user swings the controller 7 most recently. The value of the conductor input interval counter 129 affects the tempo of the ensemble.

A tempo buffer 130 is a buffer storage area for storing therein the last at least four tempo values, each calculated based on the conductor input interval counter 129.

A current tempo 131 is the current tempo of the ensemble, determined based on the last four tempo values stored in the tempo buffer 130, and is expressed in beats per minute.

A previous real time 132 is a real time stored at the previous frame.

Next, with reference to flow charts of FIGS. 23 through 29, the flow of the process performed by the CPU 10 based on the music performance program 121 will be described in detail below.

Figure 23:
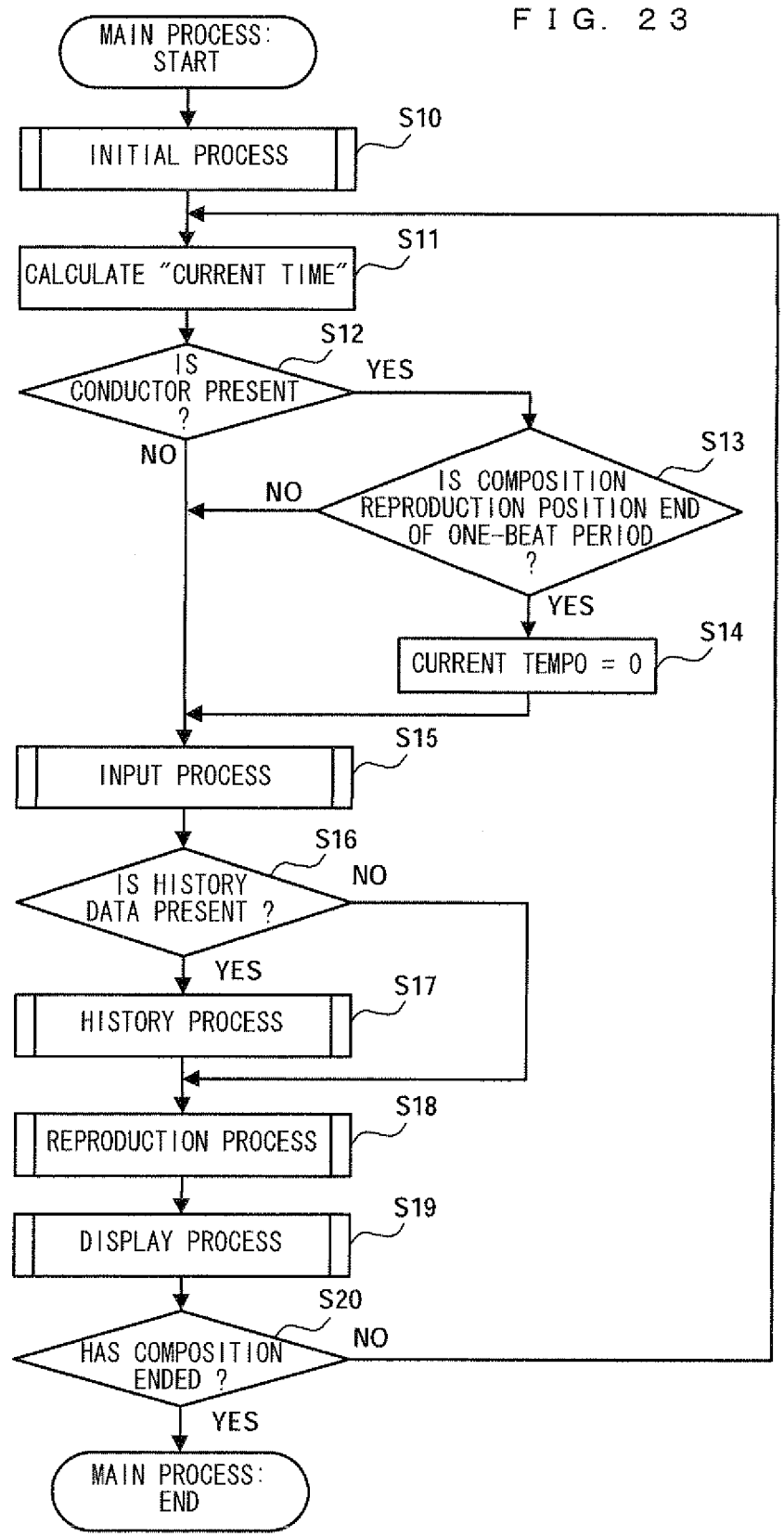
FIG. 23 is a flowchart showing the flow of a main process.

FIG. 23 is a flowchart showing the flow of a main process performed by the CPU 10 based on the music performance program 121.

Figure 24:
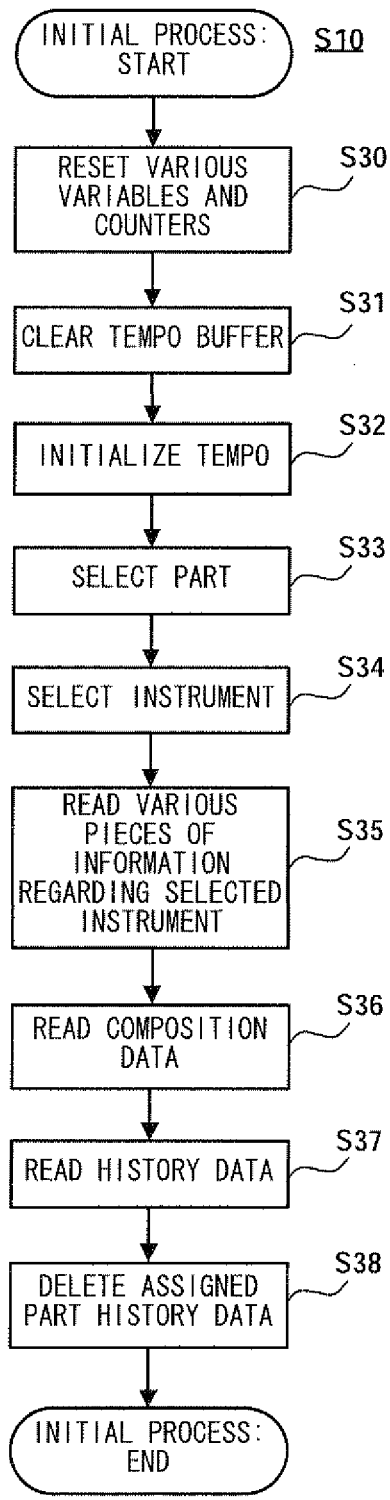
FIG. 24 is a flowchart showing the details of an initial process.

When the main process starts, the CPU 10 performs an initial process in step S10. With reference to FIG. 24, the initial process will be described in detail below.

FIG. 24 is a flow chart showing the flow of the initial process.

When the initial process starts, the CPU 10 resets various variables (the composition reproduction position 126, the current time 128, and the previous real time 132) and various counters (the write counter 124, the read counter 125, the stopped time counter 127, and the conductor input interval counter 129) in step S30.

In step S31, the CPU 10 clears the tempo buffer 130.

In step S32, the CPU 10 initializes (sets the initial value of) the current tempo 131.

In step S33, the CPU 10 selects a part to be assigned to the user. This selection is typically made based on an input from the controller 7.

In step S34, the CPU 10 selects an instrument to be played by the user. This selection is typically made based on an input from the controller 7. Note, however, that when the assigned part determined in step S33 is the conductor part or the camera part, step S34 is omitted.

Note that when a plurality of users, each using their own controller 7, simultaneously play the music performance game, the above-described process of steps S33 and S34 is performed on a user-by-user basis.

In step S35, the CPU 10 reads, from the optical disc 4 into the external main memory 12 (or the internal main memory 11e), various pieces of information (sound data, etc.) regarding the instrument selected in step S34.

In step S36, the CPU 10 reads the composition data 122 from the optical disc 4 into the external main memory 12 (or the internal main memory 11e).

In step S37, the CPU 10 reads the history data 123 from the flash memory 17 into the external main memory 12 (or the internal main memory 11e).

In step S38, the CPU 10 deletes, from the external main memory 12, the history data 123 regarding the part selected by the user in step S33. For example, when the user selects the melody 2 part in step S33, the CPU 10 deletes the melody 2 part history data 123b from the history data 123 read into the external main memory 12 in step S37.

When the initial process ends, the process proceeds to step S11 of FIG. 23.

In step S11, the CPU 10 calculates the current time 128 and stores the calculated current time 128 in the external main memory 12. As described above, the current time 128 is, as shown in FIG. 21, 4-byte data represented in the combination of "Composition Position" and "Performance-Stopped-Period Position" (i.e., the combination of the value of the composition reproduction position 126 and the value of the stopped time counter 127).

In step S12, the CPU 10 determines whether or not the conductor is present. The process proceeds to step S13 when the conductor is present, otherwise the process proceeds to step S15. Note that "the conductor is present" indicates that the user is currently assigned to the conductor part or that the conductor part history data 123f is present in the external main memory 12.

In step S13, the CPU 10 determines whether or not the composition reproduction position 126 is the end of a one-beat period (see FIG. 18). The process proceeds to step S14 when the composition reproduction position 126 is the end of a one-beat period, otherwise the process proceeds to step S15. Note that it is possible to determine whether or not the composition reproduction position 126 is the end of a one-beat period, based on, for example, whether or not the remainder when the value [in ticks] of the composition reproduction position 126 is divided by 48 is 47. When the remainder is 47, the CPU 10 determines that the composition reproduction position 126 is the end of a one-beat period. Note that while the ensemble is temporarily stopped, the composition reproduction position 126 remains the end of the one-beat period.

In step S14, the CPU 10 sets the value of the current tempo 131 to 0. Thus the ensemble is temporarily stopped until the conductor (the user who is currently playing the conductor part or the conductor part history data 123f) swings the baton next.

Figure 25:
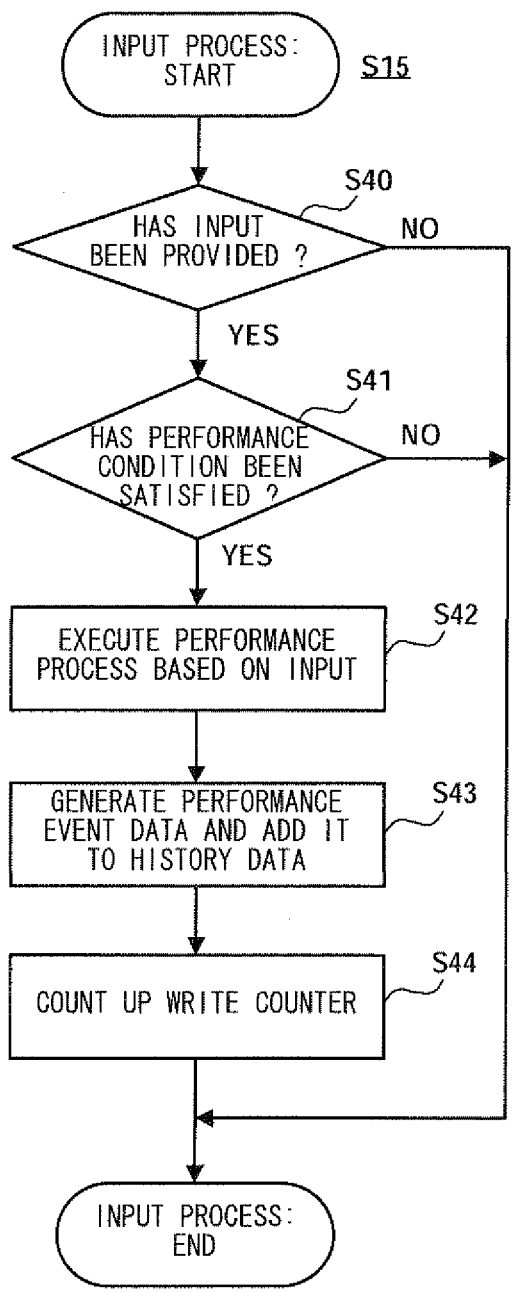
FIG. 25 is a flow chart showing the details of an input process.

In step S15, the CPU 10 performs an input process. With reference to FIG. 25, the input process will be described in detail below.

FIG. 25 is a flow chart showing the flow of the input process.

When the input process starts, the CPU 10 determines in step S40 whether or not an input (e.g., an input based on a signal from the acceleration sensor 701 or from the operation section 72) from the controller 7 has been provided. Then, the process proceeds to step S41 when an input from the controller 7 has been provided, otherwise the input process ends.

In step S41, the CPU 10 determines whether or not the input from the controller 7, detected in step S40, has satisfied a performance condition. The process proceeds to step S42 when the input has satisfied a performance condition, otherwise the input process ends. Note that the performance condition varies depending on the instrument assigned to the user. For example, when the user plays trumpet, the performance condition is "a specific button of the controller 7 is pressed". When the user is assigned to the conductor, the performance condition is "the magnitude of the acceleration of the controller 7 exceeds a threshold". Note that when the user plays guitar, guitar is required to be played by determining the swing strength based on the rate of change of the acceleration at a local maximum point of the acceleration, surrounded by the dashed circle in FIG. 12. Thus the performance condition is "the magnitude of the acceleration of the controller 7, after exceeding a threshold, returns to, for example, 0 again".

In step S42, the CPU 10 executes a performance process (a process of outputting the sound of the instrument from the speaker 2a) based on the input from the controller 7, detected in step S40.

In step S43, the CPU 10 generates a piece of performance event data (see FIG. 20) based on the input from the controller 7, detected in step S40, and adds the generated piece of performance event data to the history data 123 regarding the assigned part. For example, when the user's assigned to the melody 1 part, the CPU 10 adds the generated piece of performance event data to the melody 1 part history data 123a. Note that the piece of performance event data is stored in an area, provided in the external main memory 12 and indicated by the write counter 124 of the assigned part. The value of the current time 128 is stored in "Time" of the piece of performance event data.

In step S44, the CPU 10 counts up the write counter 124 of the assigned part. When step S44 is completed, the input process ends.

When the input process ends, the process proceeds to step S16 of FIG. 23.

In step S16, the CPU 10 determines whether or not the history data 123 is present in the external main memory 12. The process proceeds to step S17 when the history data 123 is present, otherwise (e.g., when the user plays the music performance game for the first time) the process proceeds to step S18. Note, however, that as for the currently assigned part, a history process described below is omitted, regardless of the presence or absence of the history data 123 regarding the currently assigned part. That is, only when the history data 123 regarding the parts other than the currently assigned part is present, the history process described below is performed based on the history data 123 regarding these parts (i.e., the parts other than the assigned part).

Figure 26:
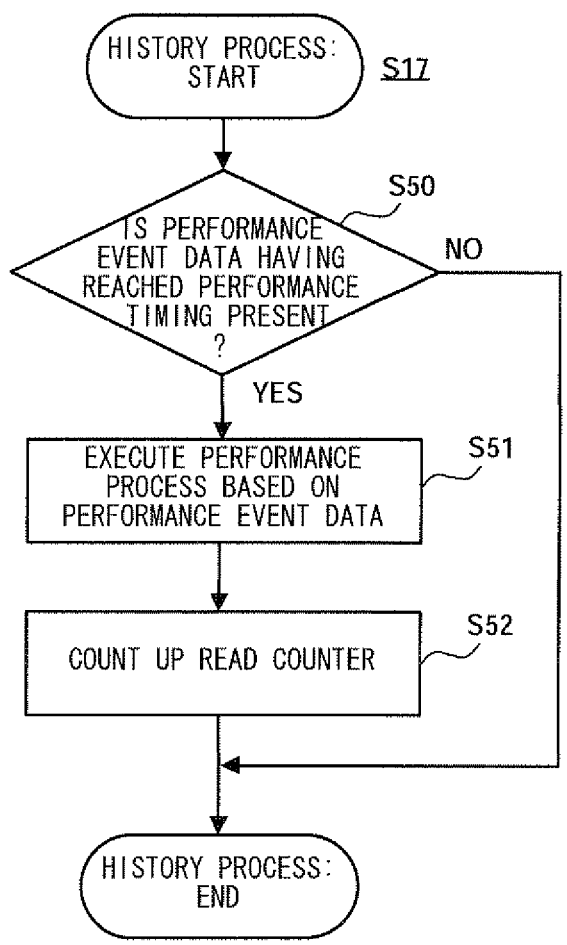
FIG. 26 is a flow chart showing the details of a history process.

In step S17, the CPU 10 performs the history process. The history process is a process of playing instruments in accordance with the history data 123. Note that when only the conductor part history data 123f and the camera part history data 123g are present, the history process may be omitted. With reference to FIG. 26, the history process will be described in detail below.

FIG. 26 is a flow chart showing the flow of the history process.

When the history process starts, the CPU 10 determines in step S50 whether or not, of the pieces of performance event data included in the history data 123 stored in the external main memory 12, a piece of performance event data having reached the performance timing is present. The process proceeds to step S51 when a piece of performance event data having reached the performance timing is present, otherwise the history process ends. In the history data 123, the pieces of performance event data are stored in chronological order on a part-by-part basis, and are processed by the CPU 10 in sequential order starting from the oldest piece based on the read counter 125 of each part. In step S50, the CPU 10 compares "Time" of the pieces of performance event data, indicated by the read counter 125 of each part, to the current time 128, and thus determines whether or not a piece of performance event data having the value of "Time" smaller than the value of the current time 128 (i.e., a piece of performance event data having reached the performance timing) is present.

In step S51, the CPU 10 executes the performance process based on the piece of performance event data having reached the performance timing. That is, the CPU 10 outputs, from the speaker 2a, a sound corresponding to the information of "Input Button", "Volume", "Swing Sharpness", and "Instrument Type", included in the piece of performance event data having reached the performance timing.

In step S52, the CPU 10 counts up the read counter 125 of the part regarding which the piece of performance event data is processed in step S51. When step S52 is completed, the history process ends.

When the history process ends, the process proceeds to step S18 of FIG. 23.

In step S18, the CPU 10 performs are production process. The reproduction process is a process of controlling the progress of the ensemble (e.g., causing the ensemble to progress in accordance with the tempo, or temporarily stopping the ensemble) With reference to FIG. 27, the reproduction process will be described in detail below.

Figure 27:
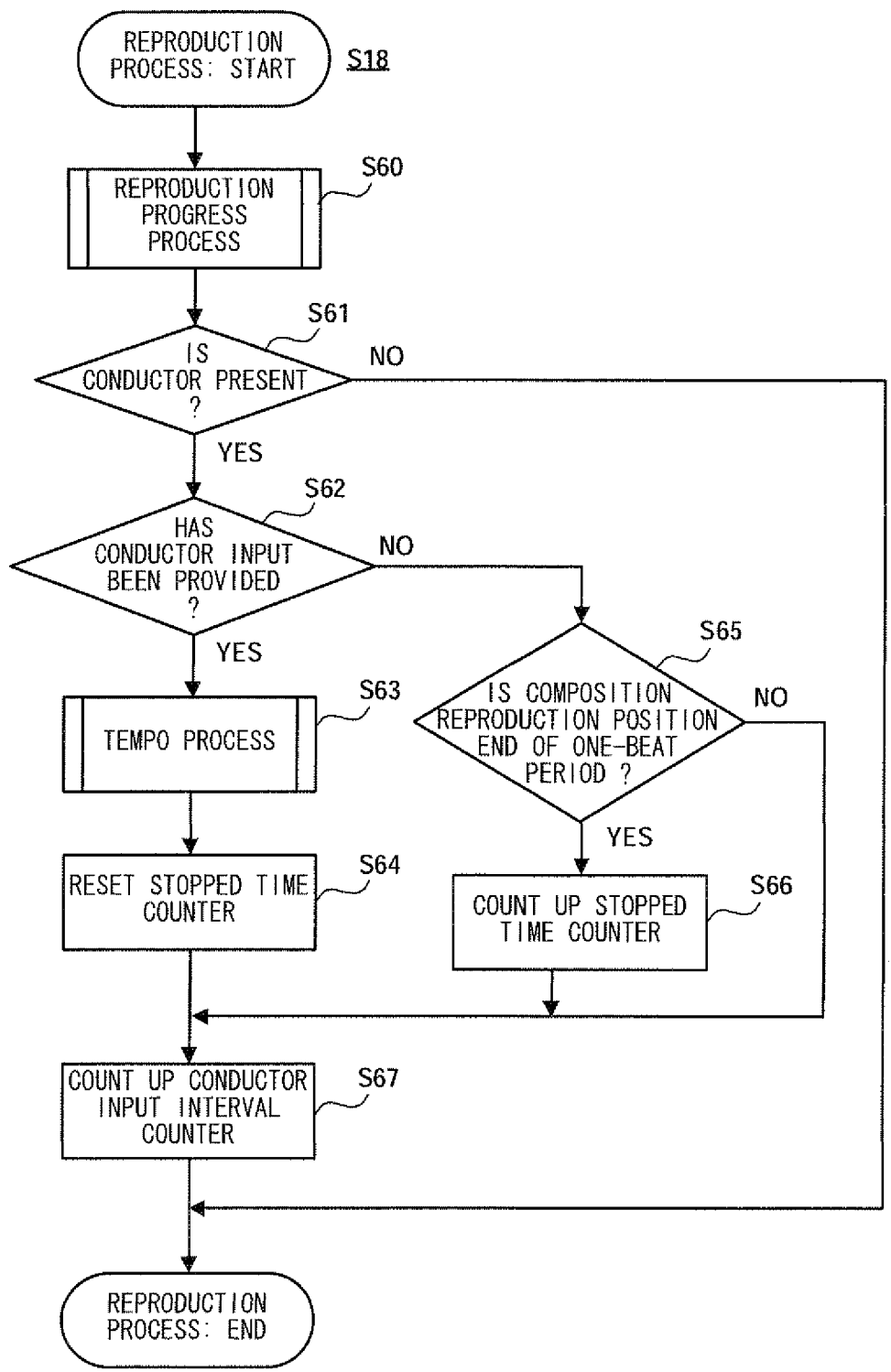
FIG. 27 is a flow chart showing the details of a reproduction process.

FIG. 27 is a flow chart showing the flow of the reproduction process.

Figure 28:
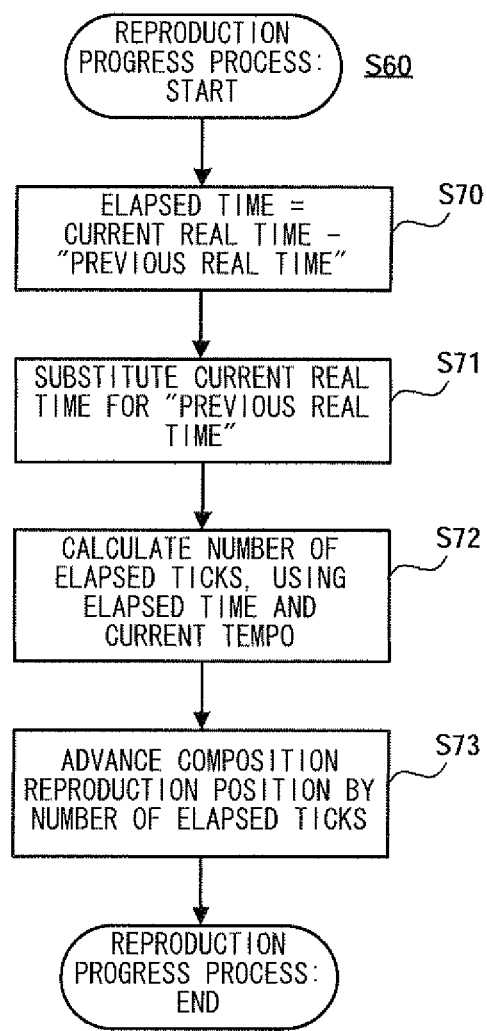
FIG. 28 is a flow chart showing the details of a tempo process.

When the reproduction process starts, the CPU 10 performs a reproduction progress process in step S60. The reproduction progress process is a process of reproducing the composition data 122 by advancing the value of the composition reproduction position 126. With reference to FIG. 28, the reproduction progress process will be described in detail below.

FIG. 28 is a flow chart showing the flow of the reproduction progress process.

When the reproduction progress process starts, the CPU calculates an elapsed time in step S70. The elapsed time is calculated by subtracting the previous real time 132 from the current real time, acquired from an RTC (Real Time Clock) or the like.

In step S71, the CPU 10 stores the current real time as the previous real time 132 in the external main memory 12.

In step S72, the CPU 10 calculates the number of elapsed ticks based on the elapsed time calculated in step S70 and on the current tempo 131. The number of elapsed ticks represents how far the reproduction position in the composition progresses from the previous frame.

In step S73, the CPU 10 advances the reproduction position in the composition by the number of elapsed ticks calculated in step S72. That is, the CPU 10 causes the composition reproduction position 126 to progress by the number of elapsed ticks calculated in step S72. Consequently, the parts other than the assigned part that do not have the history data 123 are played based on the composition data 122. When step S73 is completed, the reproduction progress process ends.

When the reproduction progress process of step S60 of FIG. 27 ends, the process proceeds to step S61.

In step S61, the CPU 10 determines whether or not the conductor is present. The process proceeds to step S62 when the conductor is present, otherwise the reproduction process ends. Note that "the conductor is present" indicates that the user's currently assigned to the conductor part or that the conductor part history data 123f is present in the external main memory 12.

In step S62, the CPU 10 determines whether or not a conductor input has been provided. The process proceeds to step S63 when a conductor input has been provided, otherwise the process proceeds to step S65. Specifically, when the user's assigned to the conductor part, the CPU 10 determines whether or not a conductor input has been provided, based on whether or not the controller 7 has been swung. On the other hand, when the user is not assigned to the conductor part, the CPU 10 makes the determination based on whether or not, in the conductor part history data 123f, a piece of performance event data having reached the performance timing is present (i.e., when the value of "Time" of a piece of performance event data, indicated by the read counter 125 of the conductor part, is smaller than the value of the current time 128, the CPU 10 determines that "a conductor input has been provided", and then counts up the read counter 125 of the conductor part.).

Figure 29:
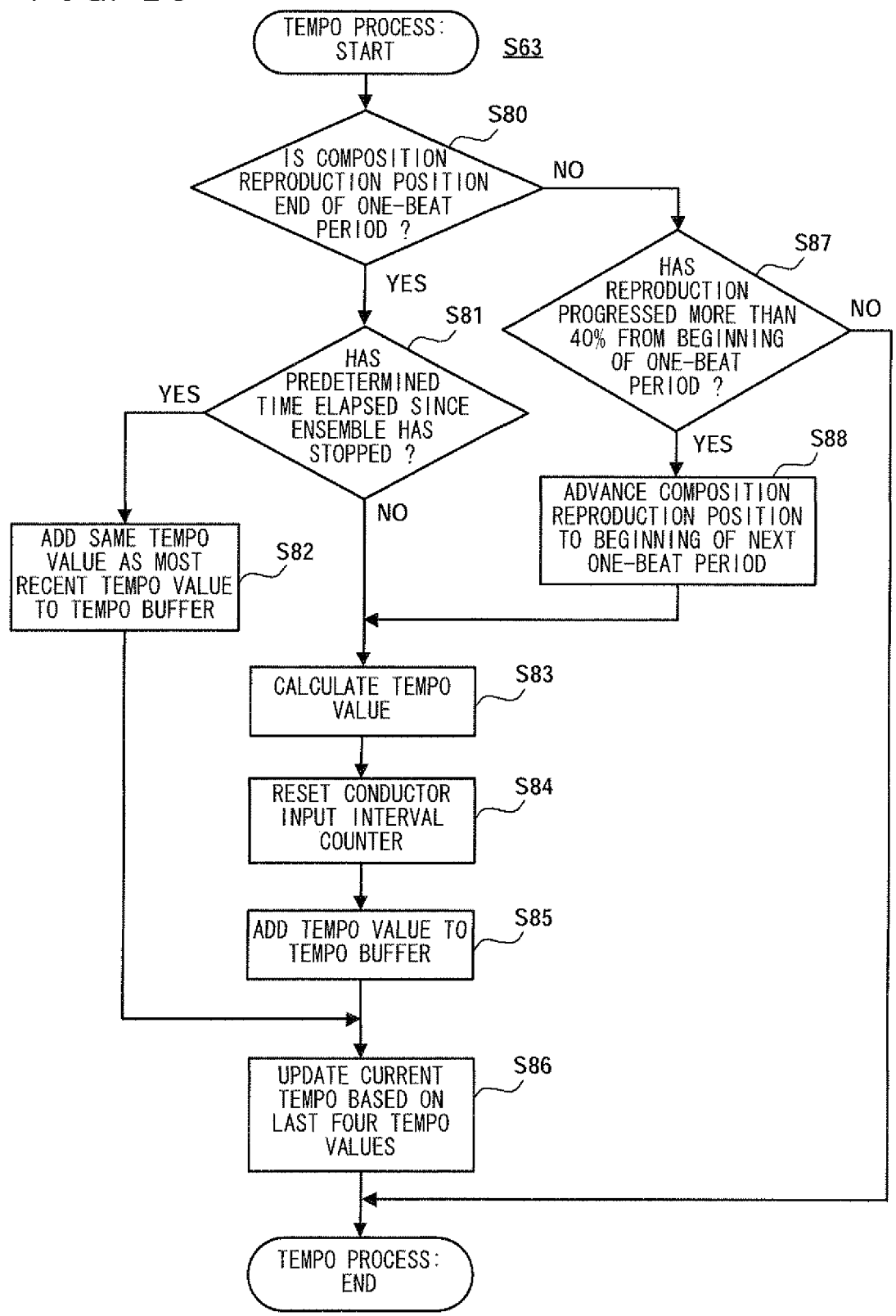
FIG. 29 is a flow chart showing the details of a reproduction progress process.

In step S63, the CPU 10 performs a tempo process. The tempo process is a process of updating the tempo (the current tempo 131) of the ensemble based on the conductor input. With reference to FIG. 29, the tempo process will be described in detail below.

FIG. 29 is a flow chart showing the flow of the tempo process.

When the tempo process starts, the CPU 10 determines in step S80 whether or not the composition reproduction position 126 is the end of a one-beat period (see FIG. 18). The process proceeds to step S81 when the composition reproduction position 126 is the end of a one-beat period, otherwise the process proceeds to step S87. Note that it is possible to determine whether or not the composition reproduction position 126 is the end of a one-beat period, based on, for example, whether or not the remainder when the value [in ticks] of the composition reproduction position 126 is divided by 48 is 47. When the remainder is 47, the CPU 10 determines that the composition reproduction position 126 is the end of a one-beat period. Note that while the ensemble is temporarily stopped, the composition reproduction position 126 remains the end of the one-beat period.

In step S81, the CPU 10 determines whether or not a predetermined time (e.g., one second) has elapsed since the ensemble has stopped. The process proceeds to step S82 when a predetermined time has elapsed, otherwise the process proceeds to step S83.

In step S82, the CPU 10 adds the same tempo value as the most recent tempo value stored in the tempo buffer 130 to the tempo buffer 130. A tempo value will be described in detail below.

In step S83, the CPU 10 calculates the tempo value based on the value of the conductor input interval counter 129. The tempo value is a value calculated to determine the current tempo 131 and is obtained by dividing 3600 (i.e., the number of frames per minute) by the value (i.e., a value representing the time between the previous conductor input and the most recent conductor input by the number of frames) of the conductor input interval counter 129, That is, it can be said that the tempo value is the tempo (the number of beats per minute) of the ensemble, calculated based only on the current value of the conductor input interval counter 129. Note that the reason that in step S82, the CPU 10 adds the same tempo value as the most recent tempo value already stored in the tempo buffer 130 to the tempo buffer 130, instead of newly calculating the tempo value when the conductor input is provided after more than a predetermined time has elapsed since the ensemble has stopped and adding the calculated tempo value to the tempo buffer 130, is that if the user does not swing the baton (the controller 7) for more than a predetermined time, it is considered that the user's not trying to slow down the tempo of the ensemble but rather trying to temporarily stop the ensemble so as to stage the solo of a certain instrument or the like. By the above-described process, even in the case where the user purposely stops the ensemble, the tempo of the ensemble does not abnormally slow down when the ensemble starts again thereafter, and thus the ensemble can be performed as intended by the user (the conductor).

In step S84, the CPU 10 resets the conductor input interval counter 129 to 0.

In step 585, the CPU 10 adds the tempo value calculated in step S83 to the tempo buffer 130. The tempo buffer 130 stores therein the last at least four tempo values.

In step S86, the CPU 10 updates the current tempo 131 based on the last four tempo values stored in the tempo buffer 130. Specifically, the current tempo 131 is newly obtained by calculating the weighted average (the more recent the tempo value, the larger the weight) of the last four tempo values stored in the tempo buffer 130. Thus, even when the cycle of the conductor input rapidly and dramatically changes, the current tempo 131 gradually changes, since the current tempo 131 is updated based on a plurality of earlier tempo values. As a result, it is possible to change the tempo of the ensemble without discomfort. Note, however, that the present invention is not limited thereto, and the current tempo 131 may be newly obtained by simply averaging a plurality of earlier tempo values stored in the tempo buffer 130. Alternatively, the current tempo 131 may be newly obtained based on a plurality of earlier tempo values stored during the most recent period of a certain length. Yet alternatively, the most recent tempo value calculated in step S83 may be used as the current tempo 131 without change. When step S86 is completed, the tempo process ends.

In step S87, the CPU 10 determines whether or not the reproduction of the composition has progressed more than 40% from the beginning of a one-beat period. The process proceeds to step S88 when the reproduction of the composition has progressed more than 40% from the beginning of a one-beat period, otherwise the tempo process ends. Thus, when the conductor input is provided in a state where the reproduction of the composition has progressed only less than 40% from the beginning of a one-beat period, the provided conductor input is ignored (i.e., neither is the reproduction position in the composition advanced to the beginning of the next one-beat period, nor is the current tempo 131 updated.). Thus the current tempo 131 is prevented from changing unnaturally due to an erroneous operation by the user or an erroneous detection of the conductor input. It is possible to determine whether or not the reproduction of the composition has progressed more than 40% from the beginning of a one-beat period, based on, for example, whether the remainder when the value [in ticks] of the composition reproduction position 126 is divided by 48 is equal to or greater than 19. When the remainder is equal to or greater than 19, the CPU 10 determines that the reproduction of the composition has progressed more than 40% from the beginning of a one-beat period.

In step S88, the CPU 10 advances the composition reproduction position 126 to the beginning of the next one-beat period. To this end, for example, a value less than 48 may be added to the value of the composition reproduction position 126, so as to be a multiple of 48. Then, the process proceeds to step S83, and the above-described process of updating the current tempo 131 is performed in steps S83 through S86.

when the tempo process of step S63 of FIG. 27 ends, the process proceeds to step S64.

In step S64, the CPU 10 resets the stopped time counter 127 to 0. Then, the process proceeds to step S67.

In step S65, the CPU 10 determines whether or not the composition reproduction position 126 is the end of a one-beat period (see FIG. 18). The process proceeds to step S66 when the composition reproduction position 126 is the end of a one-beat period, otherwise the process proceeds to step S67. Note that it is possible to determine whether or not the composition reproduction position 126 is the end of a one-beat period, based on, for example, whether or not the remainder when the value [in ticks] of the composition reproduction position 126 is divided by 48 is 47. When the remainder is 47, the CPU 10 determines that the composition reproduction position 126 is the end of a one-beat period. Note that while the ensemble is temporarily stopped, the composition reproduction position 126 remains the end of the one-beat period.

Instep S66, the CPU 10 counts up the stopped time counter 127. Then, the process proceeds to step S67.

In step S67, the CPU 10 counts up the conductor input interval counter 129. When step S67 is completed, the reproduction process ends.

When the reproduction process ends, the process proceeds to step S19 of FIG. 23.

Figure 30:
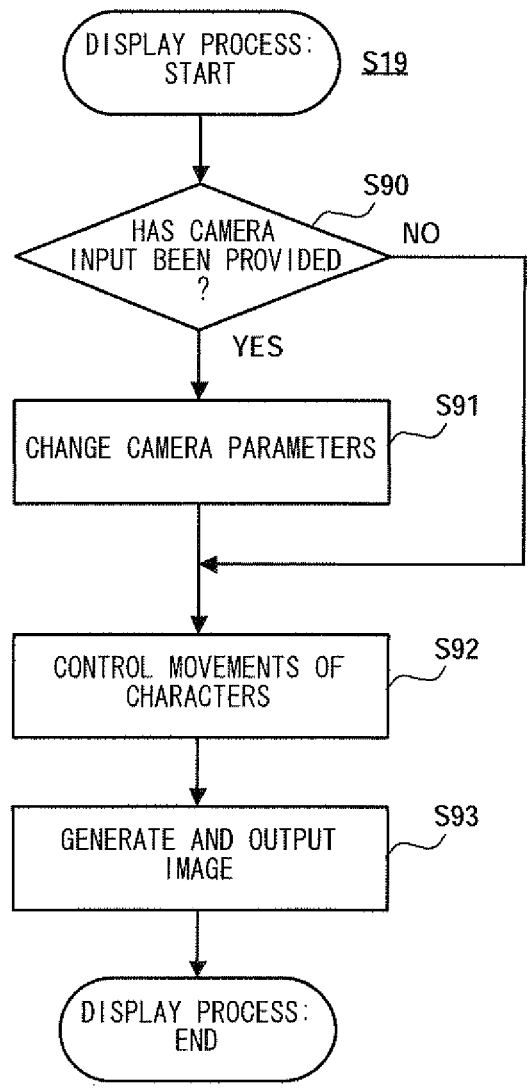
FIG. 30 is a flow chart showing the details of a display process.

In step S19, the CPU 10 performs a display process. The display process is a process of generating an image, such as that of FIG. 9, and outputting the generated image to the TV 2. With reference to FIG. 30, the display process will be described in detail below.

FIG. 30 is a flow chart showing the flow of the display process.

When the display process starts, the CPU 10 determines in step S90 whether or not a camera input has been provided. The process proceeds to step S91 when a camera input has been provided, otherwise the process proceeds to step S92. Specifically, when the user is currently assigned to the camera part, the CPU 10 determines whether or not the user has given instructions, through the controller 7, to change the position, the orientation, or the like of the camera. On the other hand, when the user is not assigned to the camera part, the CPU 10 makes the determination based on whether or not, in the camera part history data 123g, a piece of performance event data having reached the performance timing is present (i.e., when the value of "Time" of a piece of performance event data, indicated by the read counter 125 of the camera part, is smaller than the value of the current time 128, the CPU 10 determines that "a camera input has been provided", and then counts up the read counter 125 of the camera part.).

In step S91, in accordance with the camera input detected in step S90, the CPU 10 changes camera parameters representing the position, the orientation, and the like of the virtual camera VC.

In step S92, the CPU 10 controls the movements of the five characters C1, C2, C3, C4, and C5 playing instruments in the virtual game space.

In step S93, based on the camera parameters, predetermined or changed in step S91, the CPU 10 generates an image representing the appearance of the characters C1, C2, C3, C4, and C5 viewed from the virtual camera VC, and outputs the resultant image signal to the TV 2. When step S93 is completed, the display process ends.

When the display process ends, the process proceeds to step S20 of FIG. 23.

In step S20, the CPU 10 determines whether or not the composition has ended. The main process ends when the composition has ended, otherwise the process returns to step S11. Thus the above-described process is performed in one frame period (a cycle of 1/60 second) and then repeated from when the playing of the composition starts to when the composition ends.

Note that after the composition ends, the main process may not end, and alternatively, the user may subsequently re-select a certain part and perform the ensemble of the same composition again.

As described above, according to the present embodiment, by changing assigned parts and repeating an ensemble, the user can play the instruments (or conduct the ensemble or control the camera) of all of the seven parts (melody 1, melody 2, bass, chord, percussion, conductor, camera) based on his/her own operation and complete the ensemble alone.

Further, according to the present embodiment, by being assigned to the conductor part, the user can change the tempo of the ensemble while playing the composition. Additionally, by being assigned to the conductor part, the user can also change the tempo of the user's past musical performances reproduced based on the history data 123, later.

Further, according to the present embodiment, not only when the user is assigned to the instrument parts or the conductor part, but also when assigned to the camera part, the particulars of the user's camera operation at that time are stored as the history data 123 in association with "Composition Reproduction Position", and thus the user can generate an image as intended even when the tempo of the ensemble is changed later.

Further, according to the present embodiment, since, in the history data 123, "Time" indicating the performance timing is stored in the combination of "Composition Position" and "Performance-Stopped-Period Position", even if the tempo of the ensemble is changed in accordance with the user's conducting when the user's past musical performances are being reproduced based on the history data 123, the user's past musical performances can be appropriately reproduced in accordance with the changed tempo. Additionally, the user's musical performances during the ensemble having temporarily stopped can be appropriately reproduced later.

Further, according to the present embodiment, since, as shown in FIG. 21, "Time" is represented by the 4-byte value, of which the two high-order bytes indicate the position (the number of ticks counted from the beginning of the composition) in the composition and the two low-order bytes indicate the position (the number of elapsed frames since the performance has stopped) during the performance having stopped, it is possible to easily make the determination of step S50 of FIG. 26 by a large/small comparison of numerical data. With reference to FIGS. 31A and 31B, these features will be described. Note that, for ease of description, it is assumed that in the history data 123, the value of "Time" is represented by a three-digit decimal number, of which the two high-order digits indicate "Composition Position" and the one low-order digit indicates "Performance-Stopped-Period Position", FIG. 31A shows performance event data A, B, C, D, and E to be added to the history data 123 at a first frame through a twelfth frame when the user plays a certain instrument. At the first frame through the fourth frame, the tempo of the ensemble is "Fast", and "Composition Position" progresses by 3 per frame. At the fourth frame through the eighth frame, the ensemble is stopped (i.e., the tempo of the ensemble is 0), "Composition Position" does not change, and "Performance-Stopped-Period Position" progresses by 1 per frame. At the eighth frame through the twelfth frame, the tempo of the ensemble is "Slow", and "Composition Position" progresses by 1 per frame. The user produces the sound of the instrument at the first, third, sixth, eleventh, and twelfth frames. As a result, to the history data 123 the following is added: the performance event data A, of which the value of "Time" is 100, at the first frame; the performance event data B, of which the value of "Time" is 160, at the third frame; the performance event data C, of which the value of "Time" is 192, at the sixth frame; the performance event data D, of which the value of "Time" is 220, at the eleventh frame; and the performance event data E, of which the value of "Time" is 230, at the twelfth frame. The performance event data A, B, C, D, and F, thus added to the history data 123, are processed at the same timings as the timings of having been added to history data 123 (e.g., the performance event data A is processed at the first frame), unless the tempo is changed when the instrument is played based on the history data 123. However, when the user, assigned to the conductor, changes the tempo of the ensemble, the performance event data A, B, C, D, and E are processed at appropriate timings in accordance with the changed tempo.

FIG. 31B shows the timings of processing the performance event data A, B, C, D, and E when the performance event data A, B, C, D, and B, stored as shown in FIG. 31A, are reproduced at a tempo different from that used when they have been stored. At the first frame through the fifth frame, the tempo of the ensemble is "Normal" and "Composition Position" progresses by 2 per frame. At the fifth frame through the tenth frame, the ensemble is stopped (i.e., the tempo of the ensemble is 0), "Composition Position" does not change, and "Performance-Stopped-Period Position" progresses by 1 per frame. At the tenth frame through the twelfth frame, the tempo of the ensemble is "Very Fast", and "Composition Position" progresses by 5 per frame. The performance event data A, of which the value of "Time" is 100, is processed at the second frame, which is the frame where the value of "Current Time" first exceeds 100. The performance event data B, of which the value of "Time" is 160, is processed at the fifth frame, which is the frame where the value of "Current Time" first exceeds 160. The performance event data C, of which the value of "Time" is 192, is processed at the eleventh frame, which is the frame where the value of "Current Time" first exceeds 192. The performance event data D, of which the value of "Time" is 220, is processed at the eleventh frame, which is the frame where the value of "Current Time" first exceeds 220. That is, both the performance event data C and the performance event data D are processed at the eleventh frame. The performance event data E, of which the value of "Time" is 230, is processed at the twelfth frame, which is the frame where the value of "Current Time" first exceeds 230.

As described above, in the history data 123, "Time" is represented by (N+M) digit numerical data, of which the N (N is an integer equal to or greater than 1) high-order digits indicate "Composition Position" and the M (M is an integer equal to or greater than 1) low-order digits indicate "Performance-Stopped-Period Position", whereby it is possible, by determining whether or not the values of "Time" of pieces of performance event data have exceeded the values of "Current Time", to easily determine appropriate timings of processing the pieces of performance event data, even when the tempo of the ensemble is changed.

Note that in the present embodiment, "Performance-Stopped-Period Position" is represented by the number of elapsed frames since the ensemble has stopped, but the present invention is not limited thereto. For example, "Performance-Stopped-Period Position" maybe represented by a real time elapsed since the ensemble has stopped. Further, a value reflecting the current tempo 131 used when a piece of performance event data is generated may be stored as "Performance-Stopped-Period Position" of the piece of performance event data. For example, a value obtained by dividing the number of elapsed frames (or the real time elapsed) since the ensemble has stopped by the value of the current tempo 131 used immediately before the ensemble has stopped, may be stored as "Performance-Stopped-Period Position". In this case, when the user's musical performances are reproduced based on the history data 123, the timing of processing the piece of performance event data is determined by multiplying the value of "Performance-Stopped-Period Position" of the piece of performance event data by the value of the current tempo 131 (the tempo used immediately before the ensemble has stopped). Thus the user's past musical performances during the ensemble having stopped can be reproduced at a tempo corresponding to the tempo used when the ensemble is currently reproduced (i.e., at the tempo used immediately before the ensemble currently reproduced has stopped).

Note that the present embodiment is an example where the present invention is applied to the music performance game, but the present invention can also be applied to games (e.g., a race game, a shooting game, etc.) other than the music performance game. For example, when the present invention is applied to a race game, in which, for example, four race cars simultaneously run the same course, one user can simultaneously operate the four race cars (i.e., one of them is controlled by an input from the controller 7 and the other three are controlled based on the history data 123 generated when the user has played the game in the past.).

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a game program to be executed by a computer of a game apparatus having a storage device for storing replay data for reproducing game processing executed based on an operation input from an input device,
the game program causing the computer of the game apparatus to execute:
executing first game processing based on the operation input from the input device;
generating first replay data for reproducing the first game processing and storing the generated first replay data in the storage device;
reading the first replay data from the storage device;
executing second game processing based on both the first replay data read from the storage device and a current operation input from the input device; and
generating second replay data for reproducing the second game processing and storing the generated second replay data in the storage device.

2. The non-transitory computer-readable storage medium according to claim 1,
wherein the game program causing the computer of the game apparatus to further execute reproducing the first game processing based on the first replay data and changing a reproduction speed of the first game processing in accordance with the current operation input from the input device.

3. The non-transitory computer-readable storage medium according to claim 1,
wherein the game program further causes the computer to execute selecting either reproduction-speed-variable processing for reproducing the first game processing based on the first replay data and changing a reproduction speed of the first game processing in accordance with the current operation input from the input device or selecting reproduction-speed-invariable processing for reproducing the first game processing based on the first replay data at the same speed as when the first replay data has been generated, and
wherein the processing selected from the reproduction-speed-variable processing and the reproduction-speed-invariable processing is executed as the second game processing.

4. The non-transitory computer-readable storage medium according to claim 1,
wherein the game processing includes a process of playing a composition in accordance with the operation input from the input device.

5. The non-transitory computer-readable storage medium according to claim 4,
wherein the first game processing is the process of playing a composition in accordance with the operation input from the input device, and
wherein, based on the first replay data, the playing of the composition performed in the first game processing is reproduced and a tempo of the reproduced playing is changed in accordance with the current operation input from the input device.

6. The non-transitory computer-readable storage medium according to claim 5,
wherein the tempo is changed each time the operation input from the input device occurs.

7. The non-transitory computer-readable storage medium according to claim 6,
wherein the tempo is determined in accordance with an occurrence interval of the operation inputs from the input device.

8. The non-transitory computer-readable storage medium according to claim 7,
wherein each time the operation input from the input device occurs, the tempo is determined in accordance with an average or a weighted average of the occurrence intervals of the operation inputs from the input device during the most recent period of a certain length.

9. The non-transitory computer-readable storage medium according to claim 4,
wherein the game program causing the computer of the game apparatus to further execute:
playing a composition based on composition data stored in the storage device or the first replay data read from the storage device;
changing a tempo of the playing of the composition in accordance with the first replay data read from the storage device or the current operation input from the input device; and
outputting sounds from a sound output device in accordance with the operation input from the input device while the composition is being played and while the playing of the composition is temporarily stopped in the middle of the composition,
wherein the second replay data is generated, including time information indicating a timing of outputting each of the outputted sounds, and is stored in the storage device, and
wherein, regarding the sounds outputted while the composition is being played, intra-composition position information indicating at which position in the composition each sound is outputted is stored as the time information, and regarding the sounds outputted while the playing of the composition is temporarily stopped, intra-temporarily-stopped-period position information indicating how long after the playing of the composition has stopped each sound is outputted is stored as the time information, in addition to the intra-composition position information.

10. The non-transitory computer-readable storage medium according to claim 9,
wherein the intra-composition position information is represented by a tick value, which is a unit of time for reproduction control of the composition data, and
wherein the intra-temporarily-stopped-period position information is represented by the number of frames or a real time.

11. The non-transitory computer-readable storage medium according to claim 9,
wherein the time information is represented by (N +M) digit numerical data, of which N (N is an integer equal to or greater than 1) high-order digits indicate a value of the intra-composition position information and M (M is an integer equal to or greater than 1) low-order digits indicate a value of the intra-temporarily-stopped-period position information.

12. The non-transitory computer-readable storage medium according to claim 4,
wherein the game program further causes the computer to execute selecting either reproduction-speed-variable processing for reproducing, based on the first replay data, playing of a composition, performed in the first game processing and changing a tempo of the reproduced playing in accordance with the current operation input from the input device or selecting reproduction-speed-invariable processing for reproducing, based on the first replay data and at the same tempo as when the first replay data has been generated, the playing of the composition, performed in the first game processing, and
wherein the processing selected from the reproduction-speed-variable processing and the reproduction-speed-invariable processing is executed as the second game processing.

13. The non-transitory computer-readable storage medium according to claim 4,
wherein the game program causing the computer of the game apparatus to further execute:
playing a composition based on composition data stored in the storage device or the first replay data read from the storage device;
generating, in accordance with the playing of the composition played in the composition playing step, a performance image including virtual world musicians that is captured from a virtual camera, and outputting the generated performance image to a display device; and
setting various parameters of the virtual camera in accordance with the operation input from the input device,
wherein the second replay data is generated, including setting history information of the various parameters of the virtual camera, and is stored in the storage device.

14. The non-transitory computer-readable storage medium according to claim 4,
wherein the game processing includes a process of performing an ensemble of a composition using a plurality of parts based on the first replay data and the operation input from the input device,
wherein the first replay data includes musical performance data regarding one or more parts,
wherein the game program further causes the computer to execute selecting a part to be played in accordance with the operation input from the input device, and
wherein, when the musical performance data regarding the selected part is included in the first replay data, the selected part is played in accordance with the operation input from the input device, and the second replay data is generated by updating the musical performance data regarding the selected part that is included in the first replay data.

15. A game apparatus for storing replay data in a storage device for reproducing game processing executed based on an operation input from an input device, comprising:
the input device;
the storage device;
a first game processing unit for executing first game processing based on the operation input from the input device;
a first replay data generating unit for generating first replay data for reproducing the first game processing and storing the generated first replay data in the storage device;
a replay data reading unit for reading the first replay data from the storage device;
a game processing unit for executing second game processing based on both the first replay data read from the storage device by the replay data reading unit and the current operation input from the input device; and a second replay data generating unit for generating second replay data for reproducing the second game processing executed by the game processing unit and storing the generated second replay data in the storage device.

16. A game system, comprising:
a display device for displaying video data;
an input device; and
a game apparatus for storing replay data in a storage device for reproducing game processing executed based on an operation input from the input device and displaying video data on the display device, comprising:
- a first game processing unit for executing first game processing based on the operation input from the input device;
- a first replay data generating unit for generating first replay data for reproducing the first game processing and storing the generated first replay data in the storage device;
- a replay data reading unit for reading the first replay data from the storage device;
- a game processing unit for executing second game processing based on both the first replay data read from the storage device by the replay data reading unit and the current operation input from the input device; and
- a second replay data generating unit for generating second replay data for reproducing the second game processing executed by the game processing unit and storing the generated second replay data in the storage device.

17. A method for storing replay data in a storage device and for reproducing game processing executed based on an operation input from an input device, the method comprising:
- executing first game processing based on the operation input from the input device;
- generating, via one or more processors, first replay data for reproducing the first game processing and storing the generated first replay data in the storage device;
- reading the first replay data from the storage device;
- executing second game processing based on both the first replay data read from the storage device and a current operation input from the input device; and
- generating second replay data for reproducing the second game processing and storing the generated second replay data in the storage device.

* * * * *